(12) United States Patent
Vasudevan et al.

(10) Patent No.: US 6,539,221 B1
(45) Date of Patent: Mar. 25, 2003

(54) AUTOMATED WIRELESS NETWORK DESIGN

(75) Inventors: Mini Vasudevan, Richardson, TX (US); Carlos Garcia, Allen, TX (US); Chang Yu, Plano, TX (US); Hakan Ernam, Wilmington, MA (US); Will Egner, Allen, TX (US); Sairam Subramanian, Dallas, TX (US); Kenni Rasmussen, Holte (DK)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/473,746

(22) Filed: Dec. 28, 1999

Related U.S. Application Data

(63) Continuation of application No. 08/951,685, filed on Oct. 16, 1997
(60) Provisional application No. 60/116,271, filed on Jan. 19, 1999.

(51) Int. Cl.[7] .......................... H04B 17/00; H04Q 7/20
(52) U.S. Cl. .................. 455/423; 455/67.1; 455/453; 455/424; 455/425; 455/449
(58) Field of Search ................. 455/67.1, 451, 455/452, 453, 424, 405, 423, 425, 449

(56) References Cited

U.S. PATENT DOCUMENTS

| | | | | |
|---|---|---|---|---|
| 5,095,500 A | * | 3/1992 | Tayloe et al. ................. | 379/32 |
| 6,167,282 A | * | 12/2000 | Hunsberger ................. | 455/513 |
| 6,246,880 B1 | * | 6/2001 | Iizuka ......................... | 455/446 |
| 6,308,071 B1 | * | 10/2001 | Kalev ......................... | 455/446 |
| 6,336,035 B1 | * | 1/2002 | Somoza et al. ............. | 455/446 |
| 6,374,202 B1 | * | 4/2002 | Robinson ..................... | 703/13 |

* cited by examiner

*Primary Examiner*—William Trost
*Assistant Examiner*—Eugene Yun
(74) *Attorney, Agent, or Firm*—Carr Law Firm, L.L.P.

(57) ABSTRACT

The present invention is a system for optimizing an existing wireless network and additions to an existing network. The system determines a value representing estimation of traffic in discrete bins within a geographic area. The traffic estimation includes a distribution of handover and new cell traffic based at least in part on the presence of a road in any bin or the proximity of a bin to a handover boundary. The cell coverage and carrier allocations of existing cells are adjusted in view of the traffic estimation.

16 Claims, 40 Drawing Sheets

FIG. 4

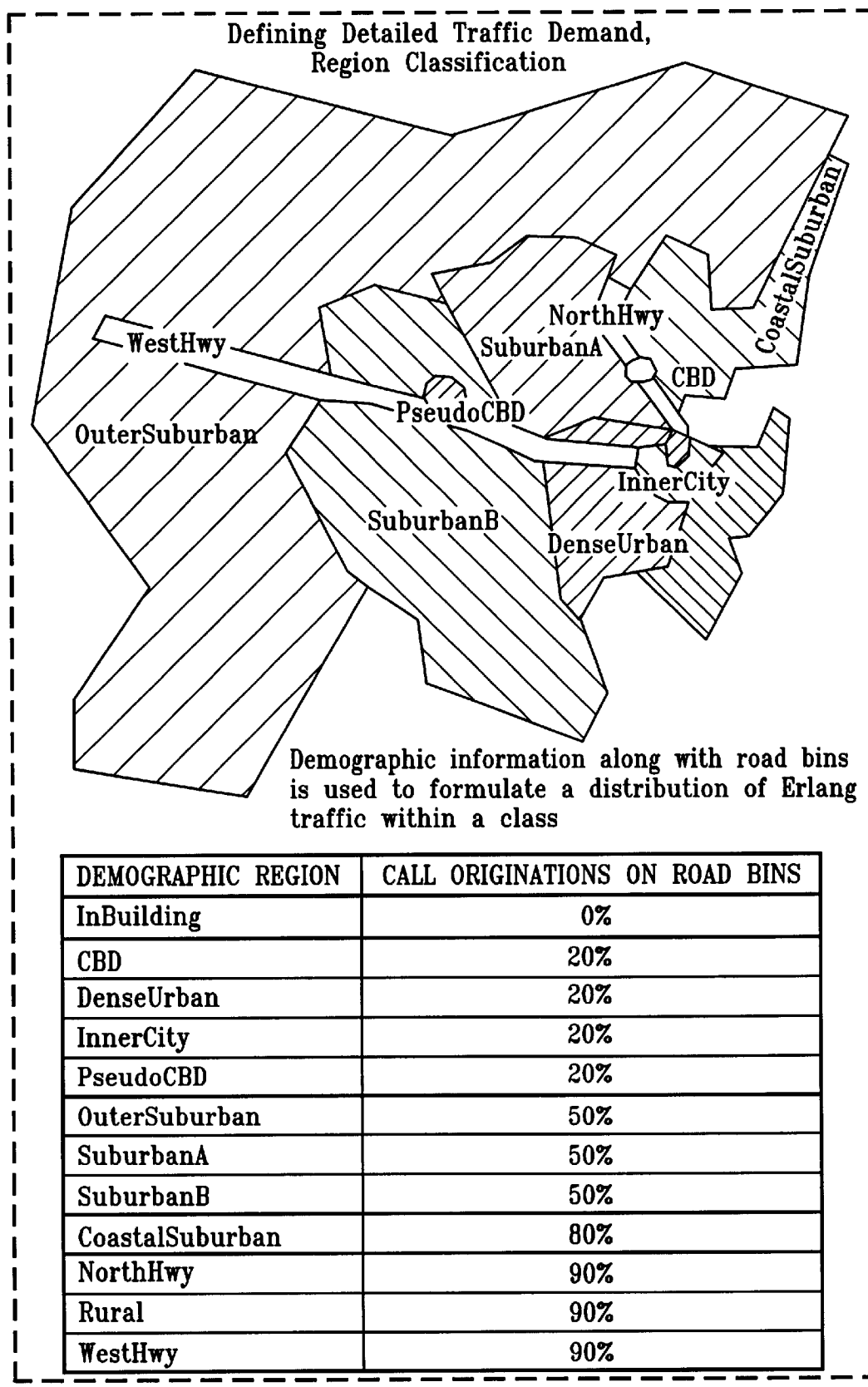

Defining Detailed Traffic Demand, Region Classification

Demographic information along with road bins is used to formulate a distribution of Erlang traffic within a class

| DEMOGRAPHIC REGION | CALL ORIGINATIONS ON ROAD BINS |
|---|---|
| InBuilding | 0% |
| CBD | 20% |
| DenseUrban | 20% |
| InnerCity | 20% |
| PseudoCBD | 20% |
| OuterSuburban | 50% |
| SuburbanA | 50% |
| SuburbanB | 50% |
| CoastalSuburban | 80% |
| NorthHwy | 90% |
| Rural | 90% |
| WestHwy | 90% |

Defining Detailed Traffic Demand, Handover Vectors

Handover Information along with road bin information is used to distribute road traffic within a class weighted on per site handovers

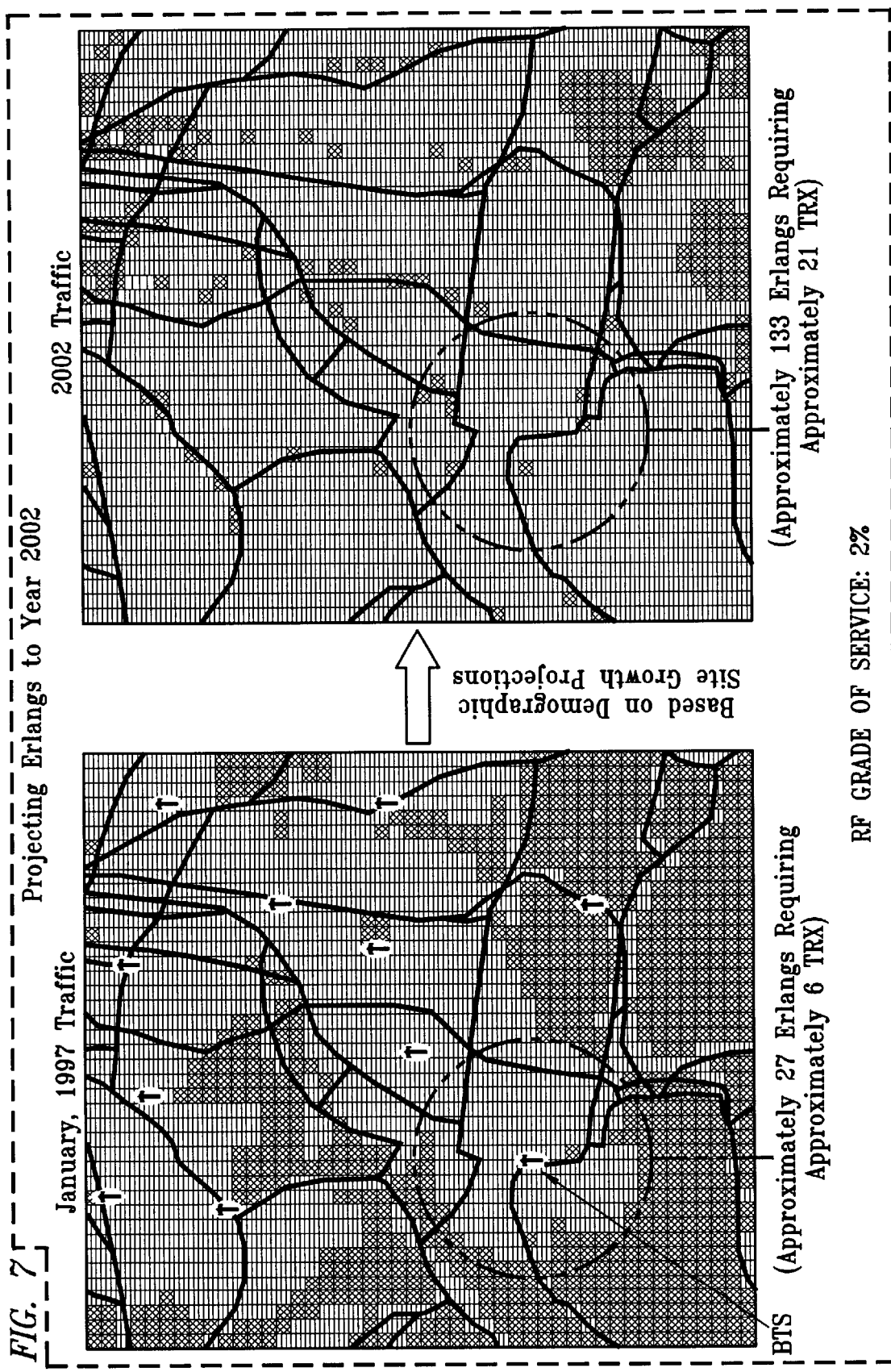

FIG. 11

Methodology Overview Cont.

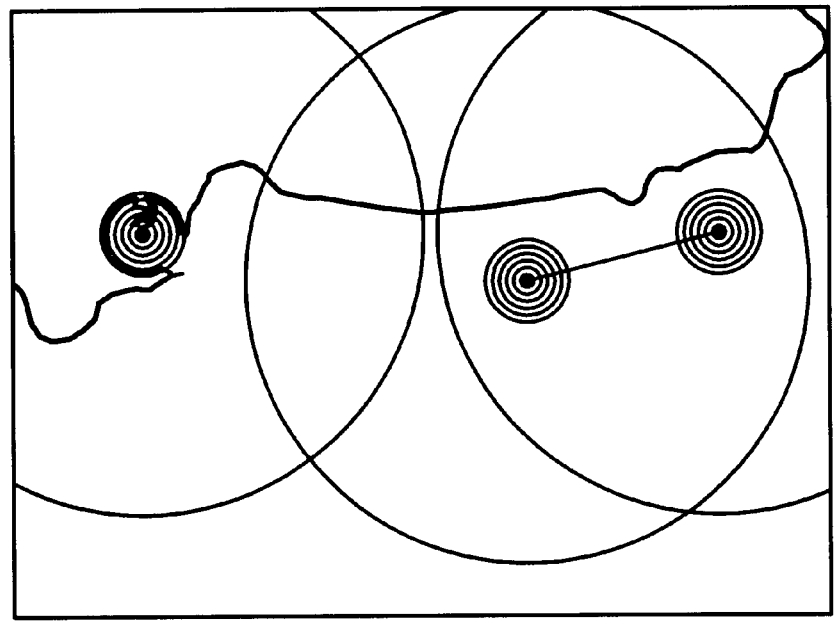

Traffic Channel Allocation OMs (calls vs. handovers) along with transportation vectors provide a more detailed representation of traffic within classes Handover vectors along with transportation vectors provide a geographical representation of subscriber mobility Clutter Data can be used to form a detailed statistical distribution of traffic within timing advance classes 100m x 100m bins classified as Road Bins FIG. 18   2.0 Algorithm Flow Diagram Original coverage Coverage after sidebased powerreduction Coverage after sectorbased powerreduction

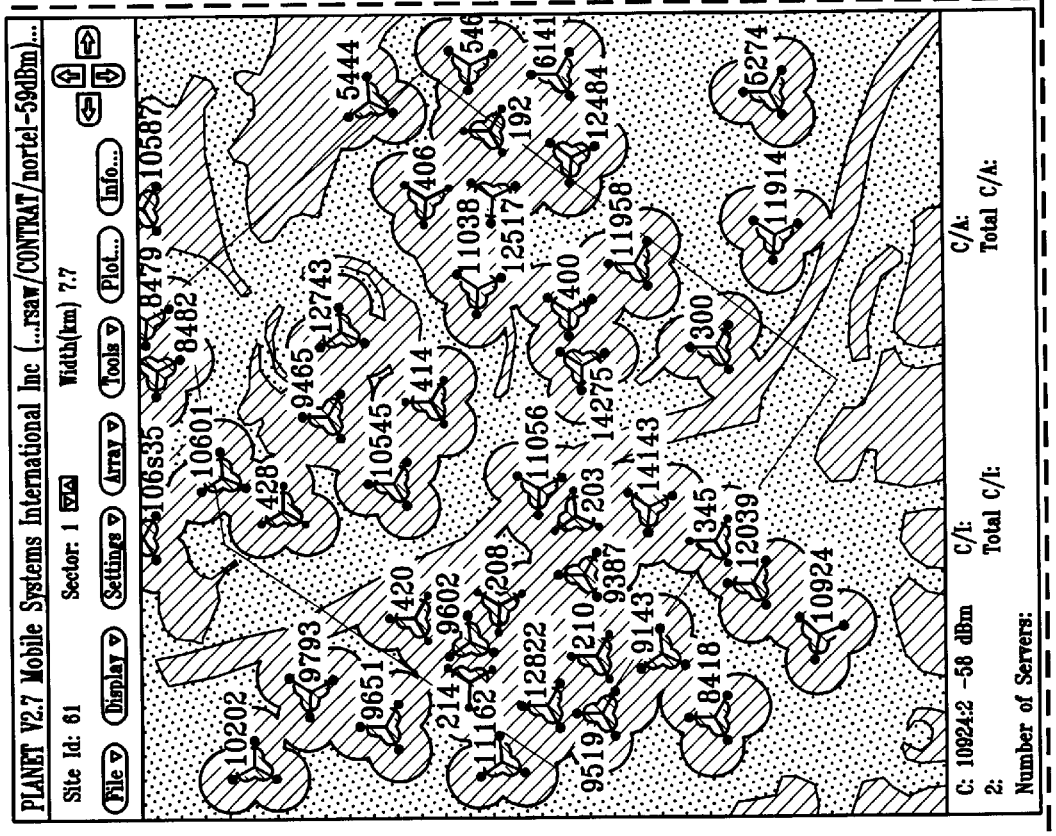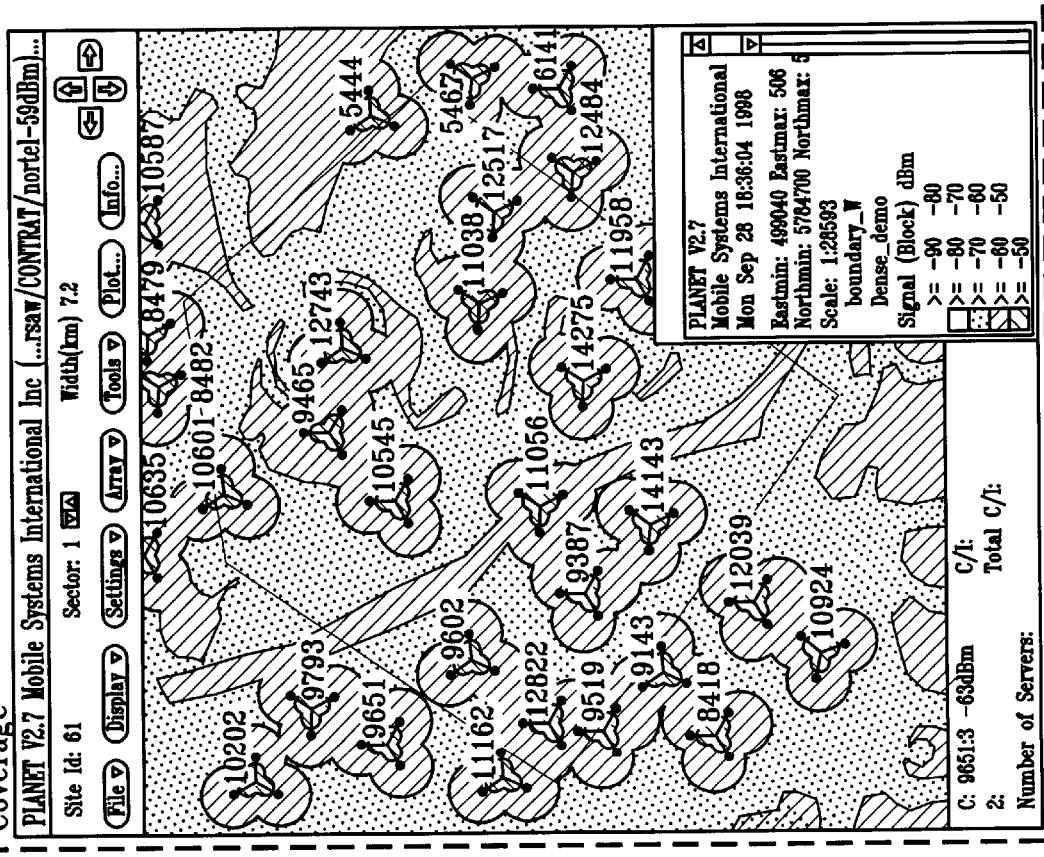
FIG. 30

AUTOMATED WIRELESS NETWORK DESIGN

This application claims benefit of Prov. No. 60/116,271 filed Jan. 19, 1999 and a continuation of Ser. No. 08/951,685 filed Oct. 16, 1997.

TECHNICAL FIELD

This invention relates to designing and implementing an efficient wireless network and, more particularly, to optimizing the configuration of an existing network or network additions.

BACKGROUND

The explosive growth in wireless traffic has lead to a need for additional carriers and an increased density of cell sites. A key problem in wireless network growth planning is to optimally configure the network in order to maximize subscriber capacity. In order to do this, we must be able to estimate the effects of adding new equipment, such as Base Transceiver Stations (BTSs), into the network. The introduction of a BTS can alter the demand, in terms of calls, seen in the neighbor BTSs and can introduce mobility events with its neighbor BTSs. Information of the existing wireless network and its served area can assist in the estimation of the operation of the evolving network. This paper will describe how we use this information to represent demand and mobility in the wireless network at a high-resolution of 100 meter by 100 meter bins. This paper will also describe how this representation of demand and mobility is used to estimate the operation of the evolving network.

The last few years have seen a tremendous demand for wireless services. Service providers have to accommodate this rapid growth on their existing networks, as well as make plans for new networks. These networks will have to be reconfigured dynamically to allow optimal performance. There is a need for a cell planning tool incorporating optimization techniques to assist RF engineers in the initial cell planning, as well as in the future growth planning stages.

Cell planning is a complex problem, as an optimal placement of all the base stations depends on traffic distribution, base station positions, power levels, type of antennas, heights of antennas, etc. Other constraints are real estate, zoning requirements, RF requirements, etc. The objective is to find an optimal cell placement together with all the parameters to achieve required grade of service and, at the same time, to minimize the cost of building (expanding) such a network.

Therefore, a need exists for a system for optimizing the configuring of an existing wireless network, or additions to an existing wireless network, to accommodate changes in demand and mobility of subscribers. Preferably, such a system would interface with other demand modeling and frequency planning tools. Preferably, the system would assist in the location and orientation of cell sites, number of Base Transceiver Stations (BTSs), allocation of carriers serving each cell and sector, as well as power adjustment and sector splitting specifications, useful in implementing reconfiguration or additions to an existing system.

SUMMARY OF THE INVENTION

The present invention is a system for optimizing an existing wireless network and additions to an existing network. The system determines a value representing estimation of traffic in discrete bins within a geographic area. The traffic estimation includes a distribution of handover and new cell traffic based at least in part on the presence of a road in any bin or the proximity of a bin to a handover boundary. The cell coverage and carrier allocations of existing cells are adjusted in view of the traffic estimation.

In one aspect of the invention, an overlay network is configured following adjustment of cell coverage and carrier allocations.

In another aspect of the invention, additional cell sites are provided following adjustment of cell coverage and carrier allocations of existing cells.

In yet another aspect of the invention, the configuration of additional cell sites is optimized.

DETAILED DESCRIPTION

A system for optimizing a network configuration is described in co-pending U.S. patent application Ser. No. 08/951,685, filed Oct. 16, 1997, and entitled "Method for Optimizing Cell Site Placement," which is incorporated herein by reference for all purposes ("Referenced System"). Also incorporated herein by reference for all purposes is U.S. Provisional Patent Application Serial No. 60/116,271, filed Jan. 19, 1999, and entitled "An Automatic Process for Growth Planning in a Wireless Network." The Referenced System is utilized as described herein to adjust or reconfigure an existing wireless network to efficiently service increases or other changes in traffic, mobility and coverage within a specified area. The Referenced System is also utilized in conjunction with the present invention to configure additions to existing wireless networks.

FIGS. 1 and 2 illustrate utilization of the Referenced System to reconfigure an existing system, as well as additions to an existing system. This process is sometimes referred to herein as "densification." The present invention and utilization of the Referenced System has application in CDMA, GSM, 3G, FDMA, and TDMA systems. In addition, the present invention and the Referenced System may be applied in cell planning, network planning and overlay network planning (e.g., GSM-900 data used to plan DCS-1800 networks). Other applications will become apparent to those skilled in the art.

Vital information needed to accurately represent existing demand and mobility are timing advance, BTS deployment and geographical data, such as major road vectors and demographics. Timing advance data is one of the most important of these data. Timing advance is a measurement taken by the BTS which calculates the amount of time that the mobile equipment needs to advance its transmission in order to be synchronized with the receiver at the BTS. The timing advance measurements are categorized in classes from 0 to 63, where each class' unit is a bit period. From the modulation rate of 270 5/6 k bits/second in the GSM standard and the electromagnetic wave velocity, the timing advance class width is approximately 554 meters. Therefore, this measurement not only describes the propagation delay of the RF signal, but also the physical separation or distance between the BTS and the mobile subscriber.

Timing advance is a measurement of round-trip transmission delay and is used to determine how much the mobile equipment has to advance its transmission in order to synchronize the BTS receiver. Measurements are taken twice each second. The receiver at the BTS observes a greater delay, typically when the mobile equipment is physically further away from the site. Multi-path scenarios can introduce additional propagation delay. The timing advance is specified in units of bit periods from zero to 63 bit periods.

Bit period for GSM is 3.69e-06 seconds; therefore, a delay of one bit period would equate to the related mobile equipment (MS) being located approximately 554 meters away from the BTS. Timing advance enables creation of a distance histogram of mobile units served by the BTS.

BTS deployment is also important in the determination of high resolution demand and mobility. From BTS deployment information, such as position, sector orientation, antenna pattern, and receiver characteristics, served areas within timing advance classes can be described more accurately. Each bin within a timing advance class can be classified as a best server bin, second best server bin, or in some other probabalistic fashion. From the BTS deployment information, handover boundaries between BTS sectors and neighbors can be determined. These boundaries, along with handover operational measurements, will be used to formulate bin-to-bin mobility.

Geographical data is also important in determining probabalistically where demand and mobility is seen within a timing advance class. A timing advance class could possibly be overlapping a major road. Major road information allows us to determine which bins within a class can be classified as road bins. These road bins, along with demand due to handovers and demographics, can be used to determine demand on major roads within a class. The road bins will also play a major role in formulating the bin-to-bin mobility. Equal power level boundaries, handover information and road bins help us determine subscriber mobility patterns at the bin level.

There is a wealth of information on all aspects of an existing wireless network, and the geographical area it is serving. The key is to use this information in a methodical, scientific and reasonable fashion in developing a good model that will be useful for network growth planning. The high resolution demand and mobility generated by this model is useful not only for cell planning, but also for network planning. The cell plan, of course, is the first step in the network evolution process. With the introduction of BTSs, best server characteristics and equal power level boundaries can change. The high resolution demand and mobility can be used with the new cell plan to determine demand within a BTS and mobility between sectors of the BTS and its neighbors. With the demand and mobility for the new cell plan, BSS, NSS and LAC optimization can be performed.

The following assumptions are made in creating a demand or traffic map of a selected area. All traffic channel allocations for a sector are assumed to have the same arrival and hold-time statistics. Characterization of road bins in a sector is either "road bin" or "non-road bin" (vehicle flow information not available at the time). Timing advance class relaying traffic due to handovers occurs on major roads, if any major roads are covered by the advance class. Timing advance class percentage of all originations on major roads, if any major roads are covered by the class, are assumed based on the served demographic area of the BTS. Waiting of traffic on road bins in an advance class are based on proximity to handover vectors; however, if no handover vectors are seen for that busy hour, the assumption is uniform. A bin is considered to be served by the BTS providing the strongest signal to the bin; therefore, not all bins within a certain range of the particular BTS are necessarily in an advance class for that BTS.

FIG. 4 illustrates use of demographic information along with road bins in formulated distribution of Erlang traffic within an advance class.

FIGS. 6, 7 and 8 illustrate the formation of bins representing traffic demand in a selected geographic area.

FIG. 7 illustrates formation of bins representing projected growth of traffic demand from calendar year 1997 to calendar year 2002, in the selected geographic area.

FIG. 8 illustrates differing resolutions of traffic bins.

FIG. 11 illustrates use of traffic channel allocation OMs (calls versus handovers), along with transportation vectors, to provide a more detailed representation of traffic within advance classes. Handover vectors, along with transportation vectors, provide a geographical representation of subscriber mobility. Clutter data can be used to form a detailed statistical distribution of traffic within timing advance classes.

I. Determining Bin Demand and Mobility Characteristics

Determination of bin demand and mobility characteristics is described in Appendix A hereto, which is incorporated herein by reference for all purposes.

Figure 1:
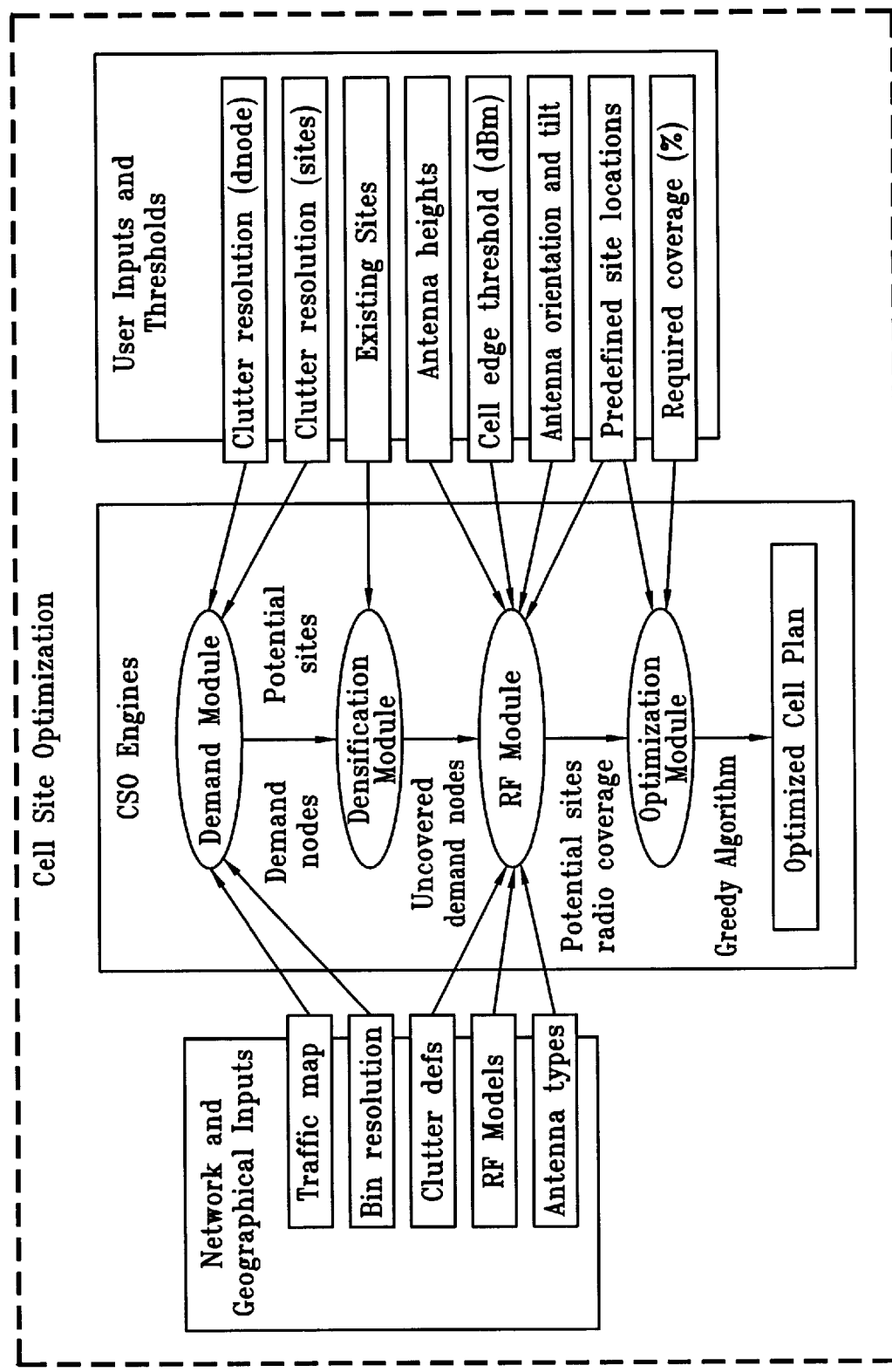
Figure 2:
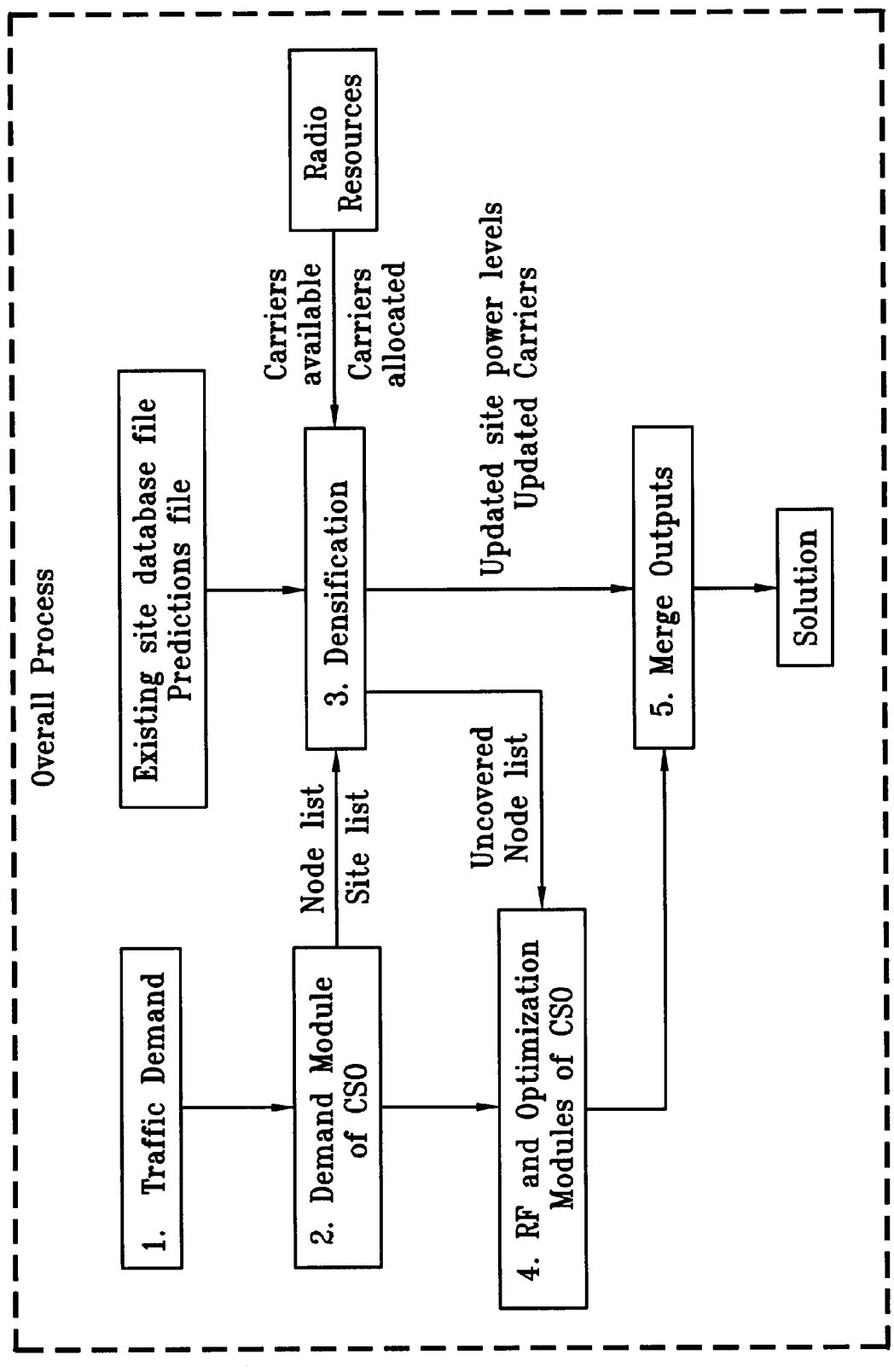
Figure 3:
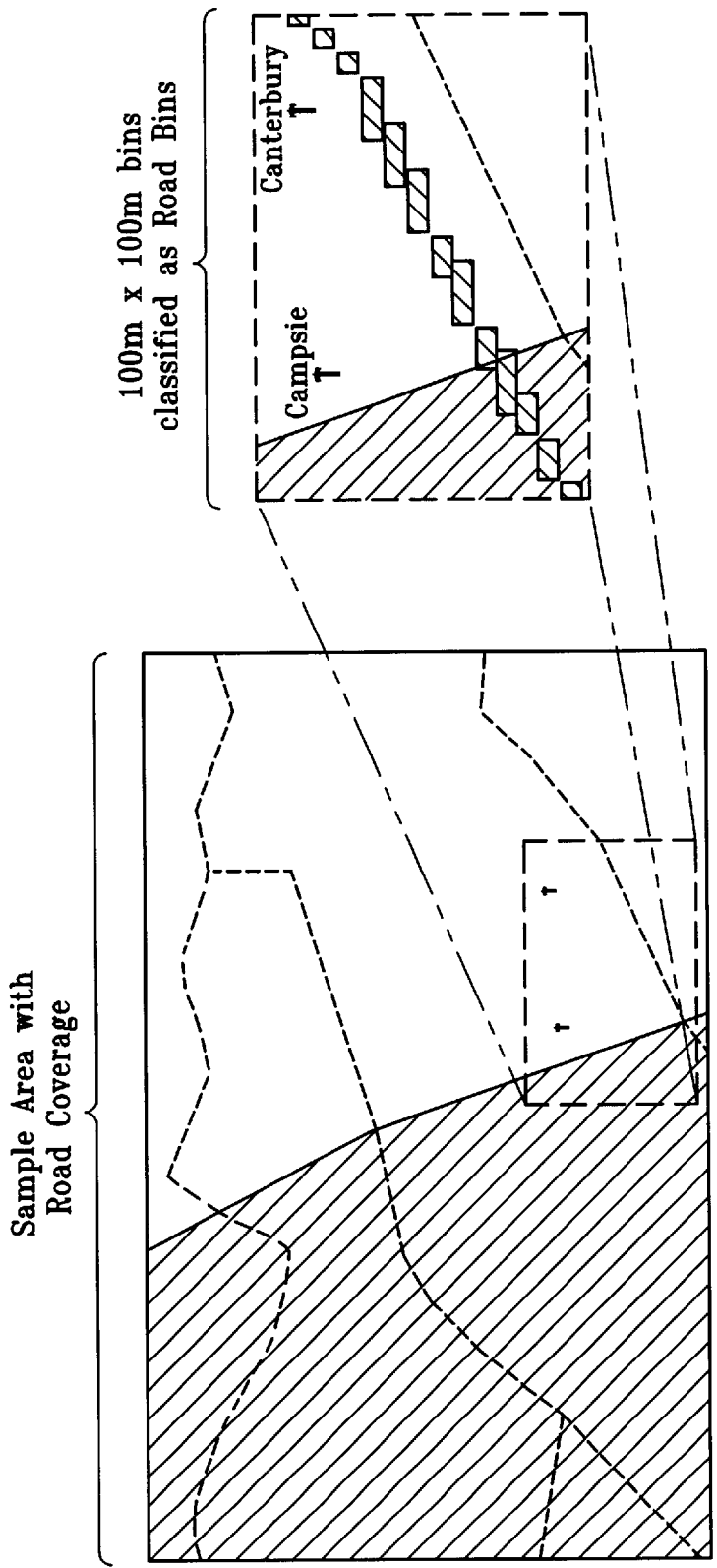
FIG. 3 illustrates the designation of road bins having a resolution of 100 m×100 m within a portion of a specified area.
Figure 5:
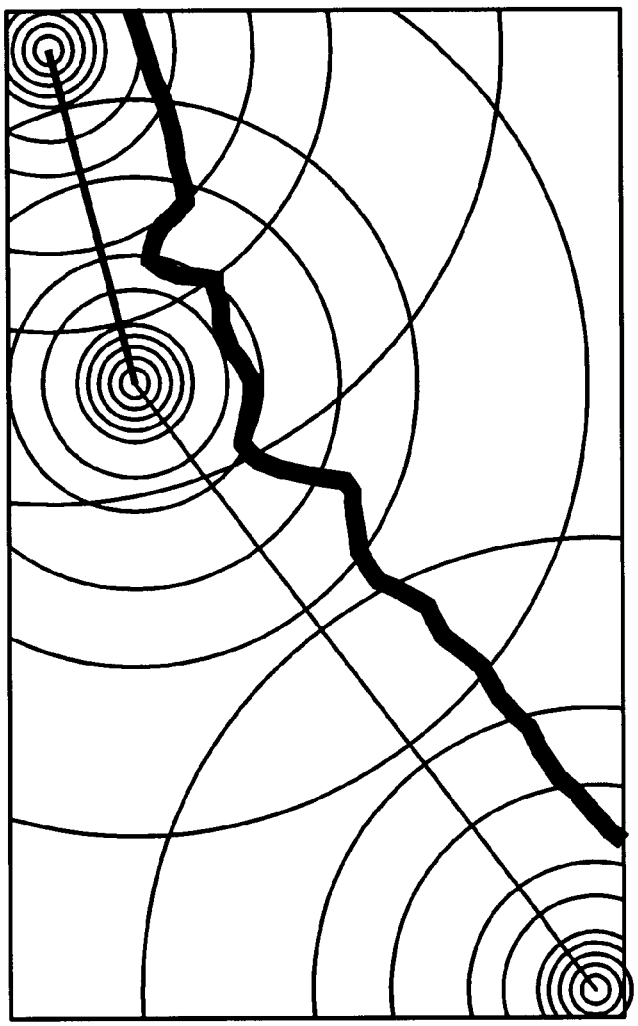
FIG. 5 illustrates use of handover information along with road bin information to distribute road traffic within a class, waited on per site handovers. Such information is used to define detailed traffic demand, as well as handover vectors.
Figure 6:
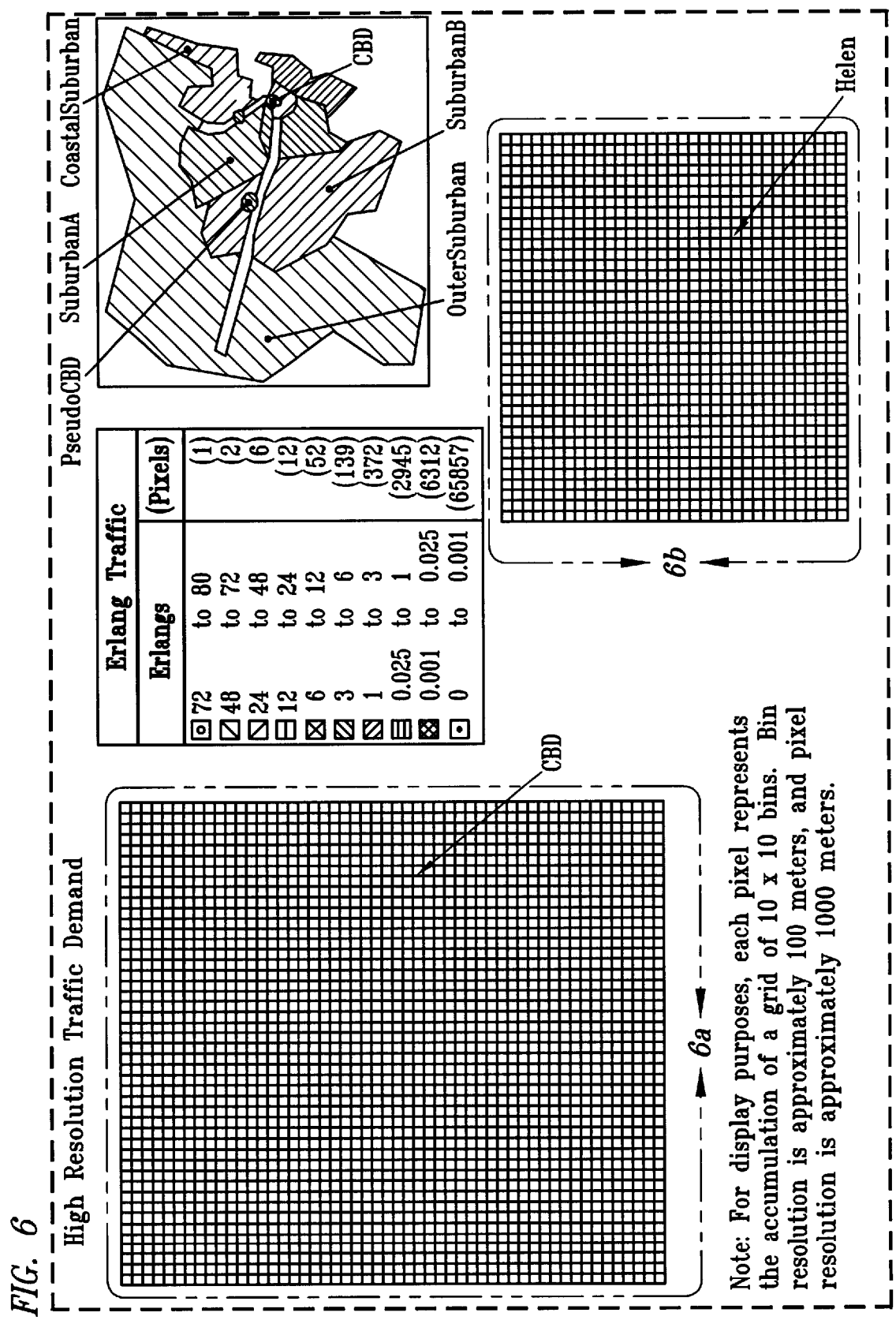
Figure 6A:
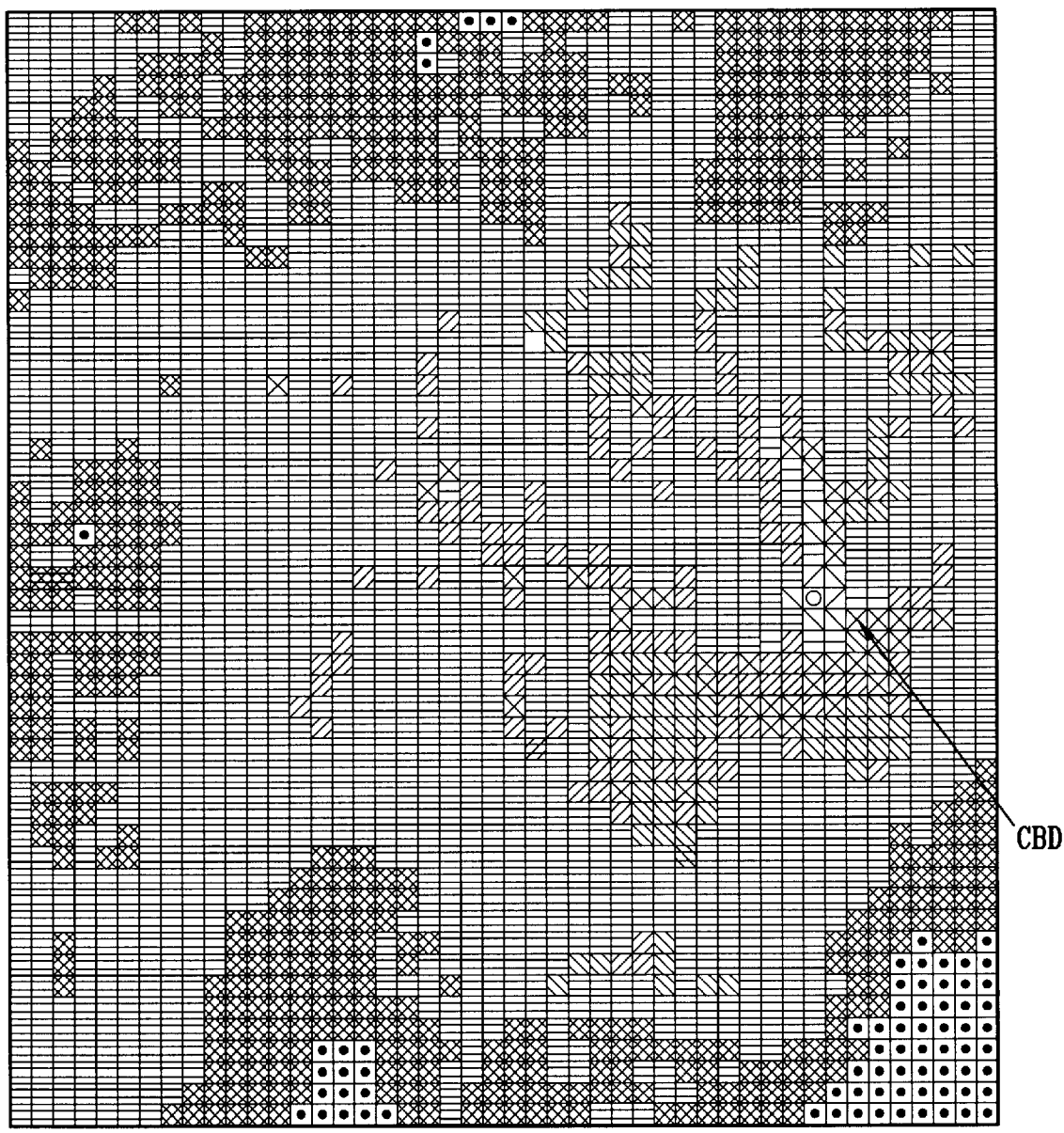
Figure 6B:
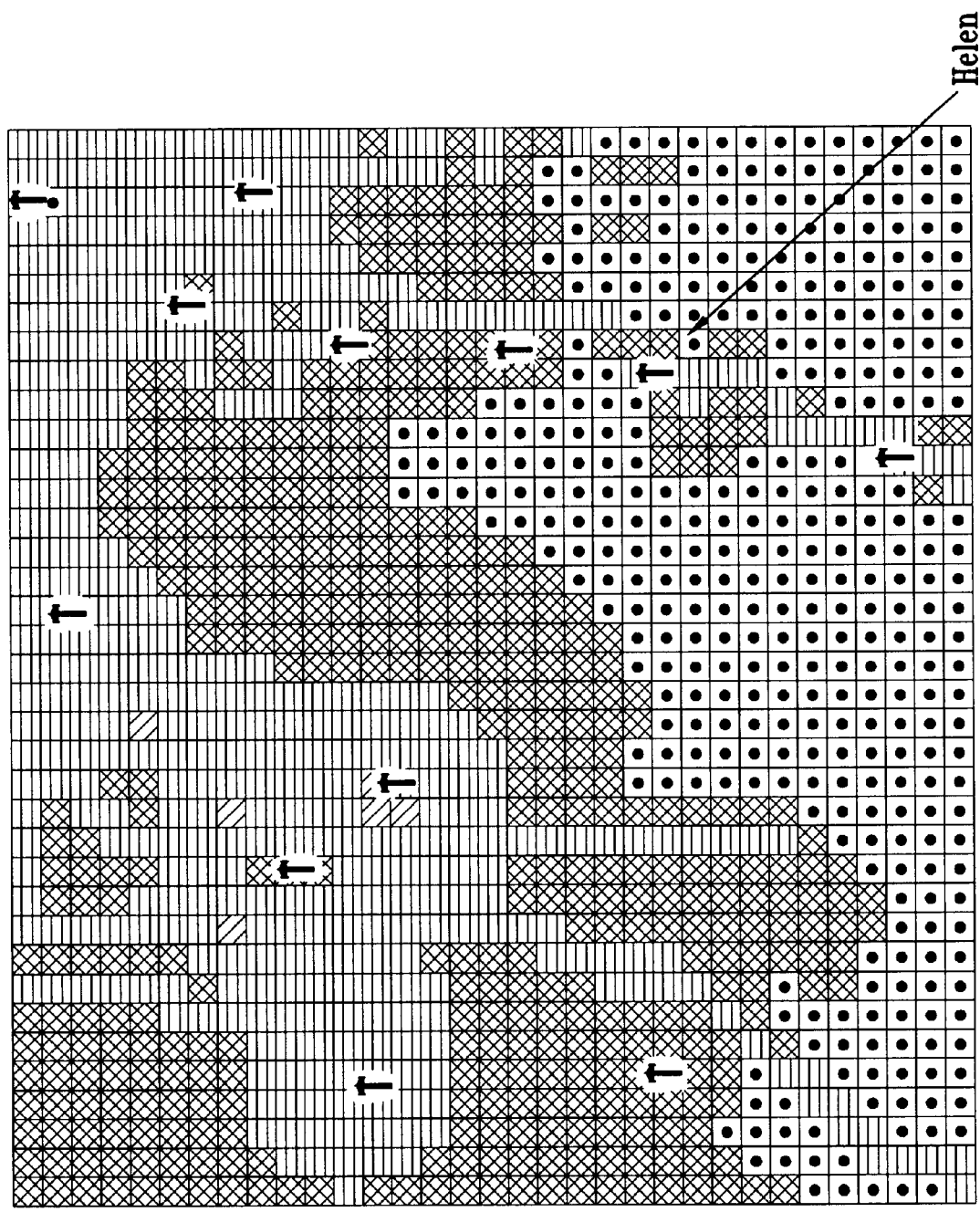
Figure 8:
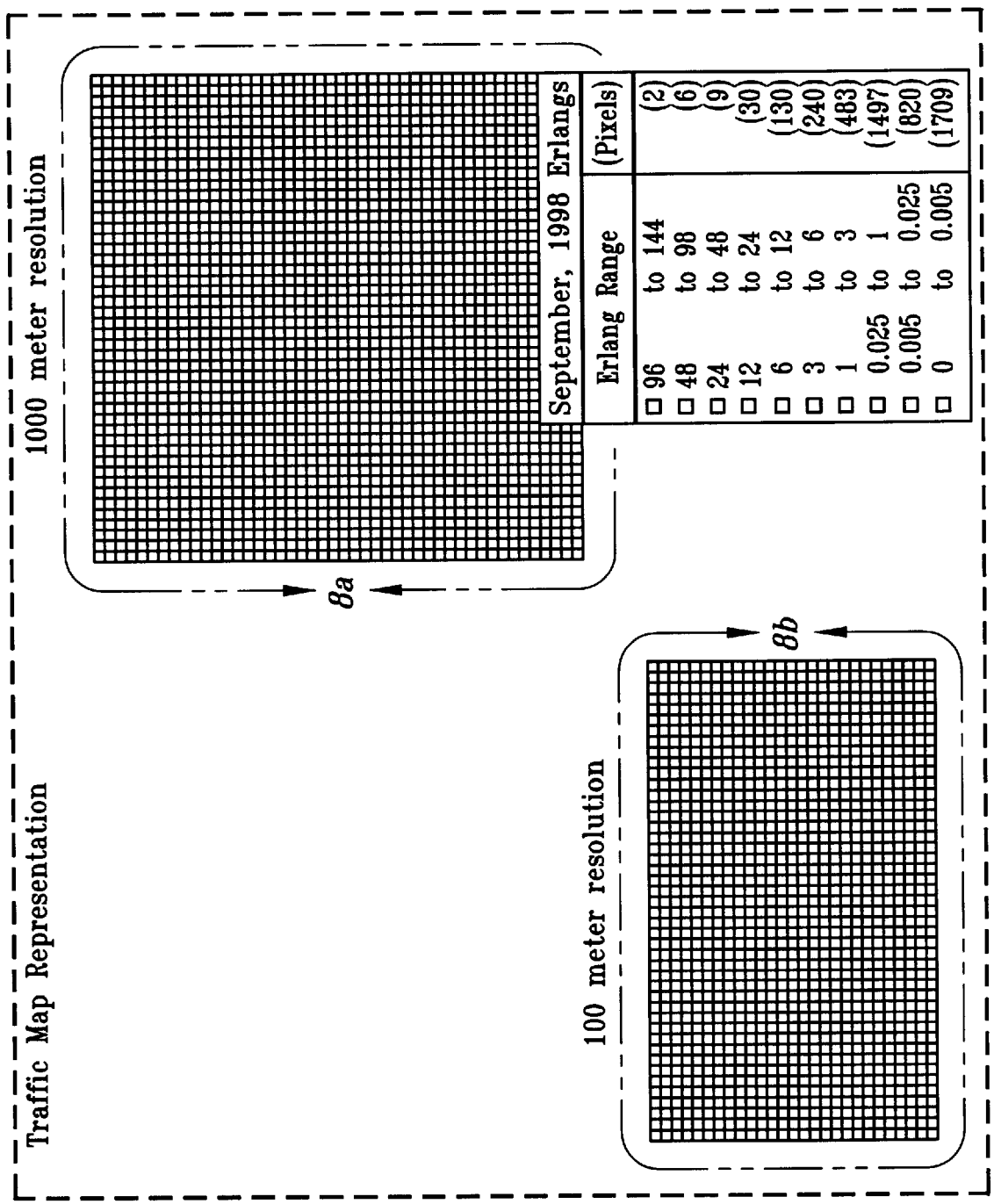
Figure 8A:
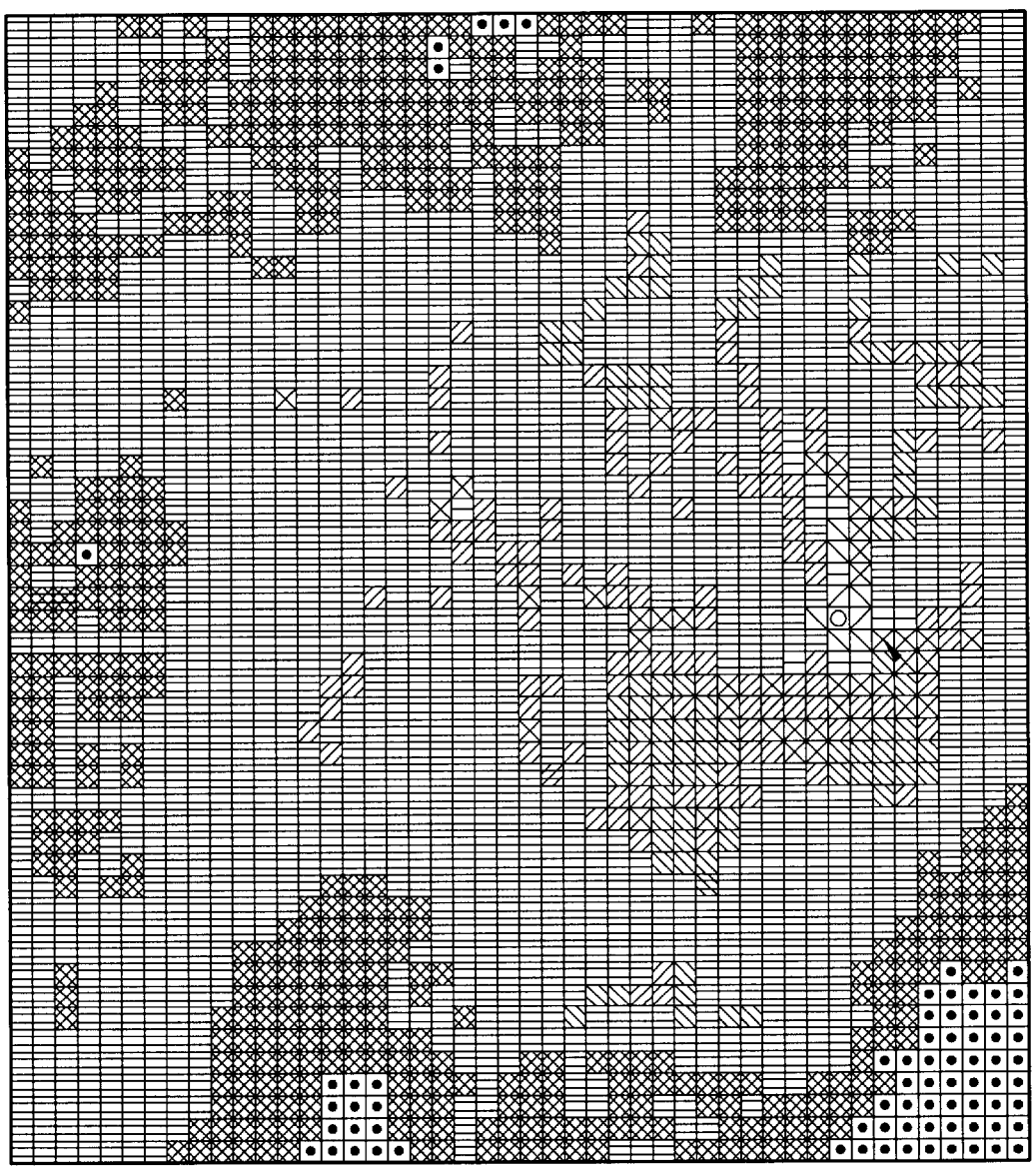
Figure 8B:
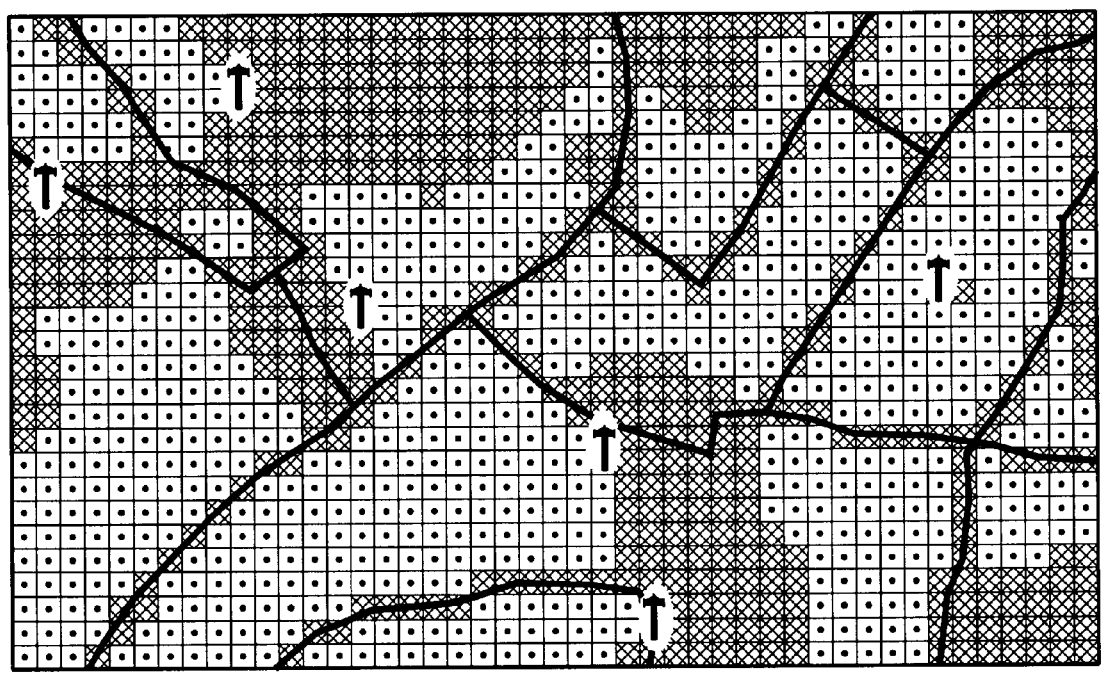
Figure 9:
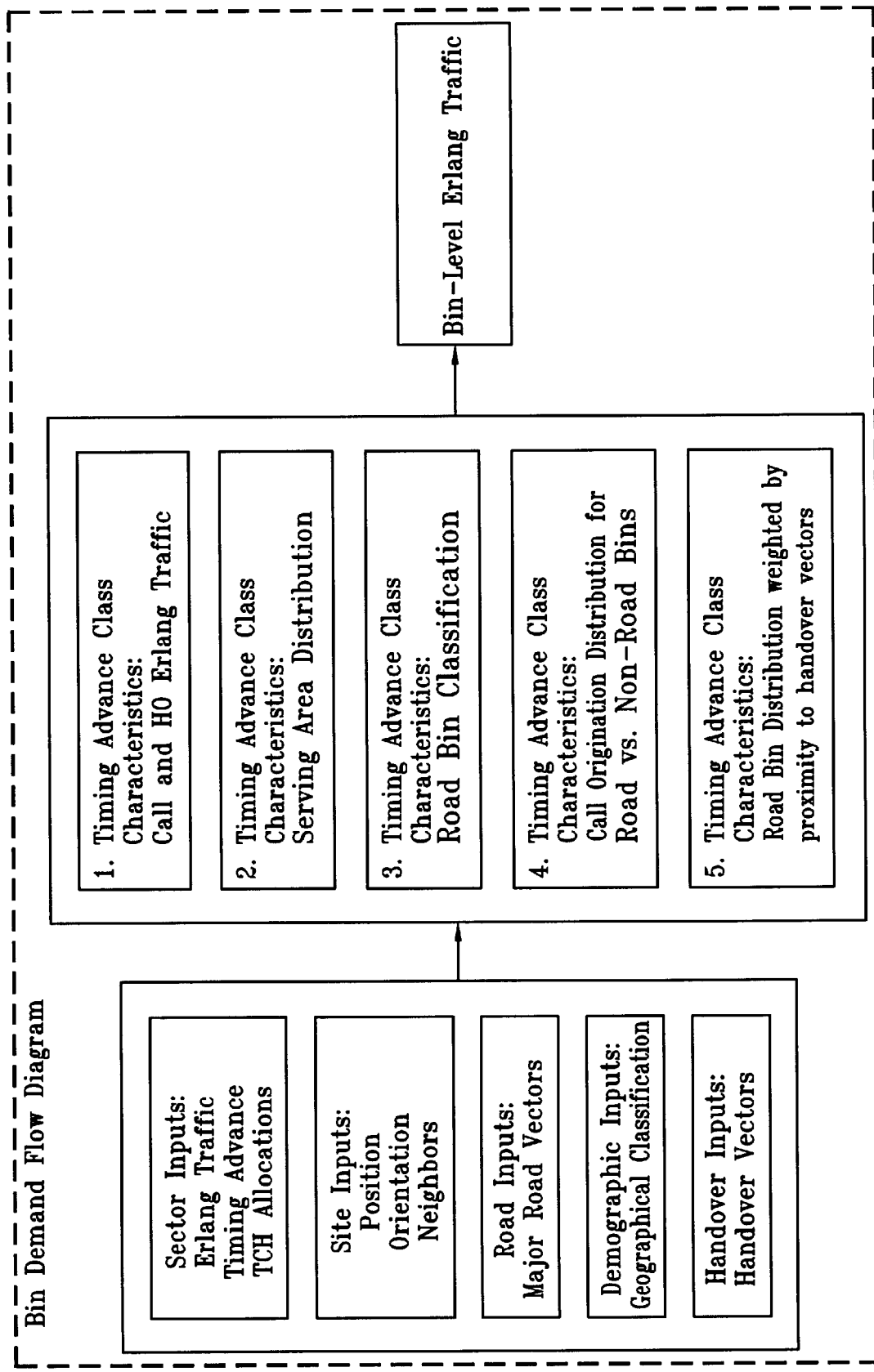
FIG. 9 illustrates the process by which bin-level Erlang traffic is developed.
Figure 10:
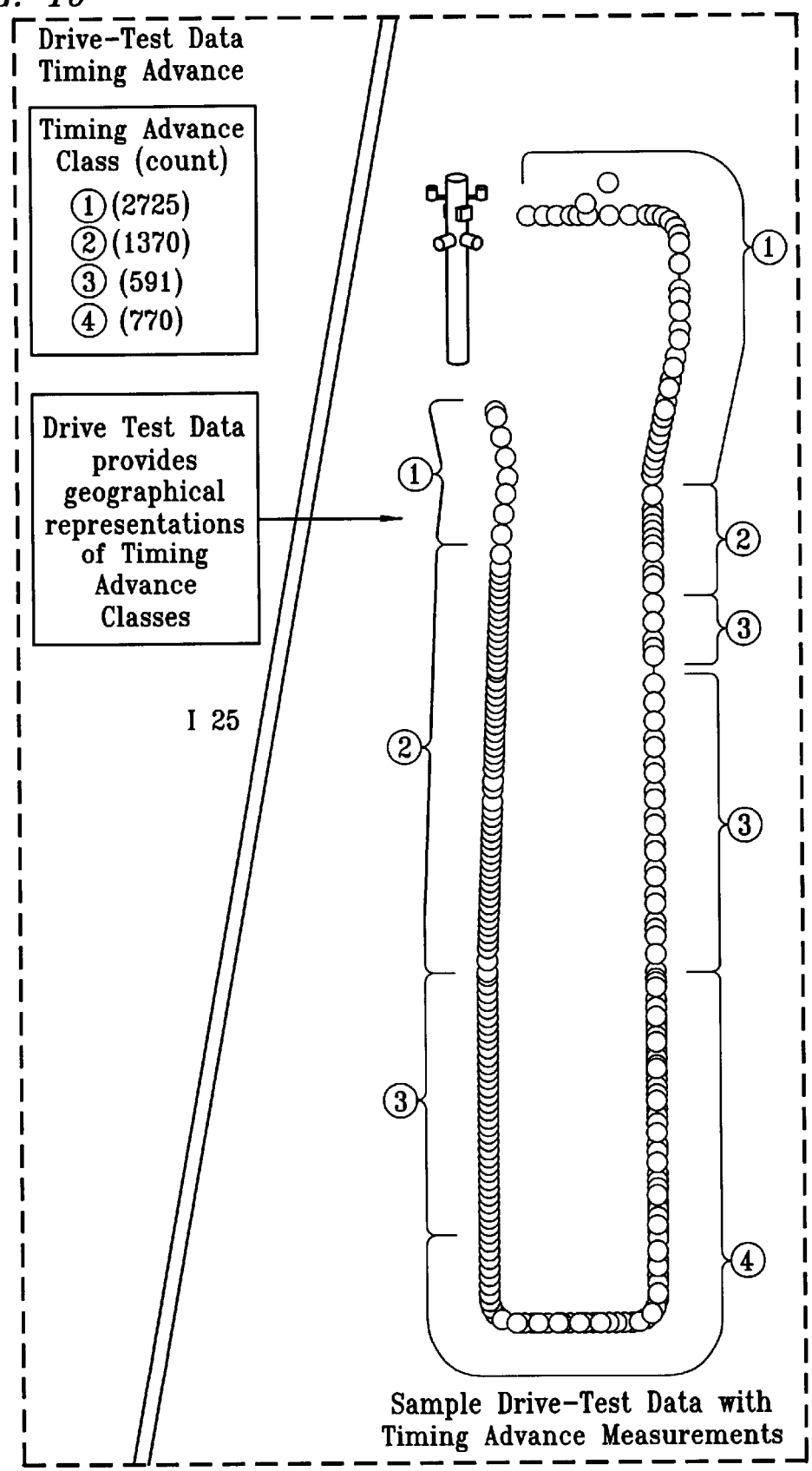
FIG. 10 illustrates use of drive-test data and timing advance measurements to formulate a geographical representation of the actual timing advance classes.
Figure 12:
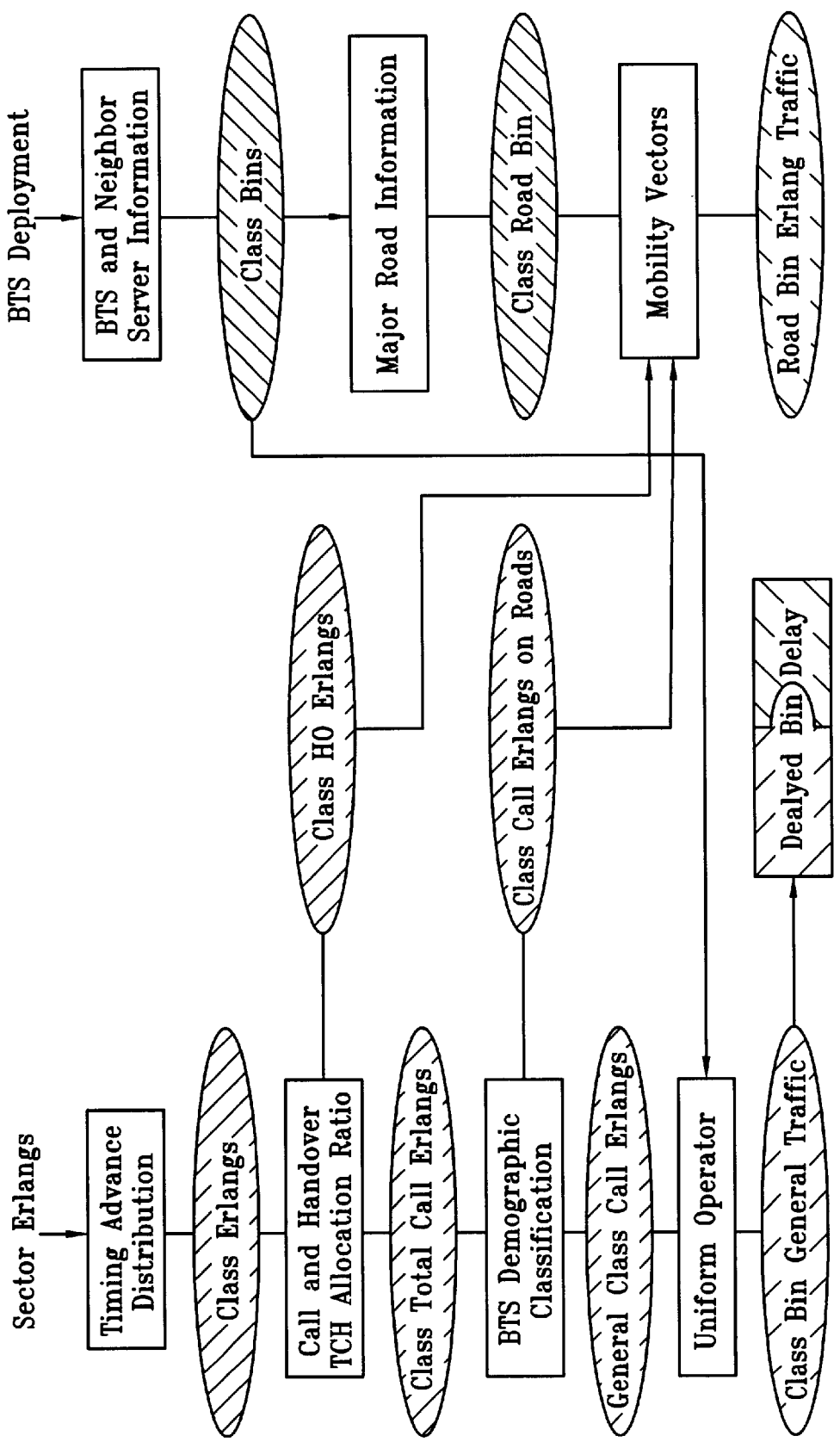

Referring to FIG. 12, the first process is to determine demand in units of Erlangs at the bin level. The first step of this process is for each class in a sector to determine Erlangs due to calls handed in to the sector, and Erlangs due to call originations on roads within the class. We will call the remaining Erlangs in the class as general Erlangs. The second step of this process is to determine which bins within the class are served. Then the served bins need to be classified as sector is the best server, second best server and otherwise. Also, of the served bins within the class, bins need to be identified as road bins or general bins. To determine the general traffic within the class, we use the class served bins and a uniform operator to distribute the class general Erlangs. To determine the class road bin Erlang traffic, mobility vectors and their count are used to weight handover Erlangs and call Erlangs on roads over the road bins. If the traffic is expected to increase for the year of interest in the network rollout, then projection factors need to be used for each demographic zone the wireless network covers. These projection factors will be used to scale the sector's traffic accordingly. This is the high-level process of determining the bin-level demand in units of Erlangs.

The second process is to determine mobility in units of subscribers between every pair of bins. The first step of this process is for each sector bin to be classified as either handover boundary bins or general bins. The second step is to weight the subscribers passing through these boundary bins based on the incoming handovers during the busy hour. The third step of this process is to extrapolate the mobility for the general bins within that sector. If the subscriber count is expected to increase for the year of interest in the network rollout, then projection factors need to be used for each demographic zone the wireless network covers. These projection factors will be used to scale the handover vectors accordingly. This is the high-level process of determining the bin-to-bin mobility in units of subscribers.

The third process is to perform a cell plan for the wireless network, whether it be the addition of new BTSs, or the placement of an overlay network. From the cell plan, each sector's coverage area bins need to be classified as best server bin, second best server bin, or otherwise. This classification of bins will be used to determine the new demand on each of the sectors. Also, for each sector, the handover boundary bins need to be identified. These boundary bins will be used to determine the new handover vectors between each of the sectors. The result of this process can now be used to perform BSS optimization, NSS optimization and LAC optimization.

Figure 13:
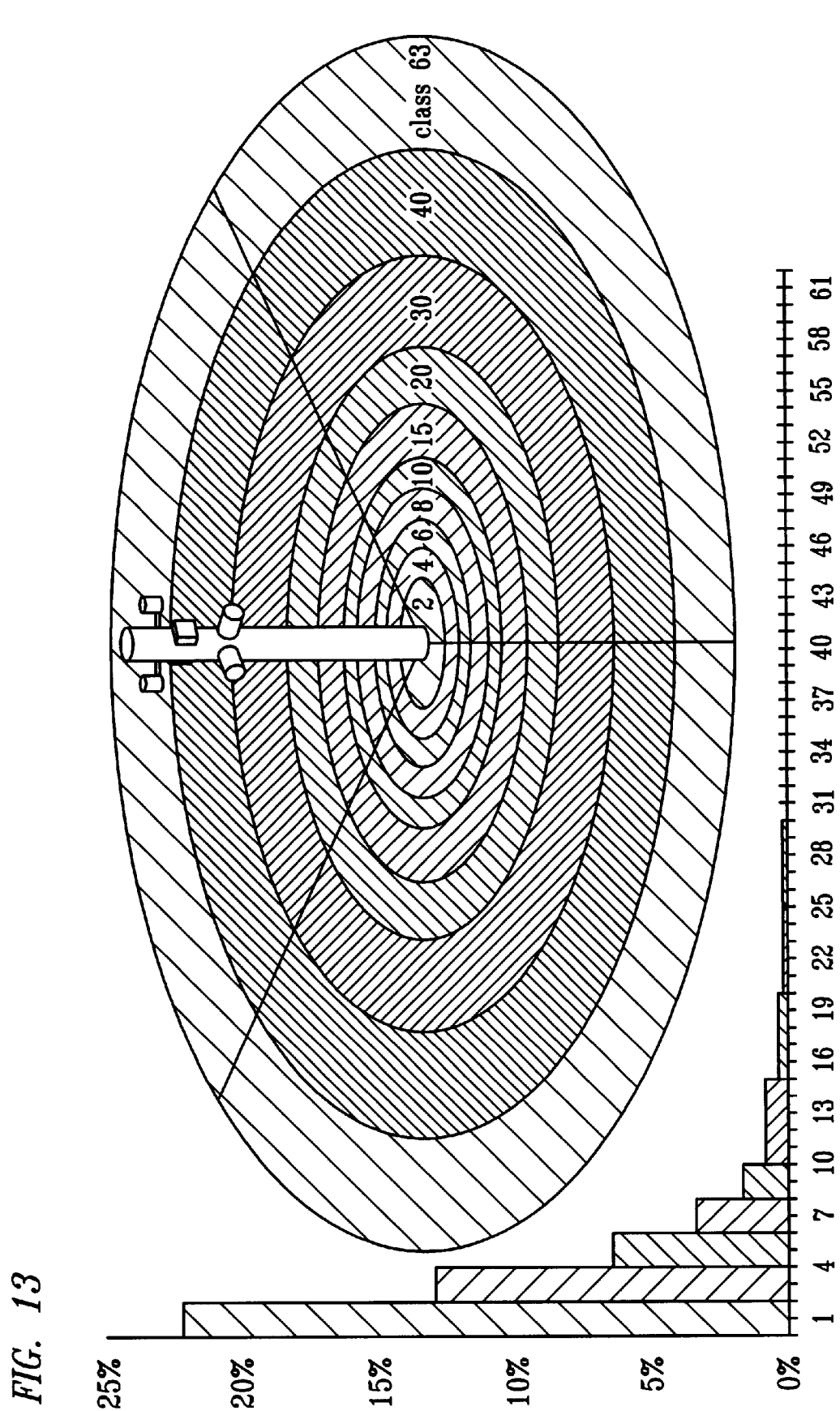

FIG. 13 depicts an idealized example of how the timing advance measurements were seen for a sector for a particular busy hour. The histogram or distribution can be used to project the sector Erlang traffic onto each of the classes.

Figure 14:
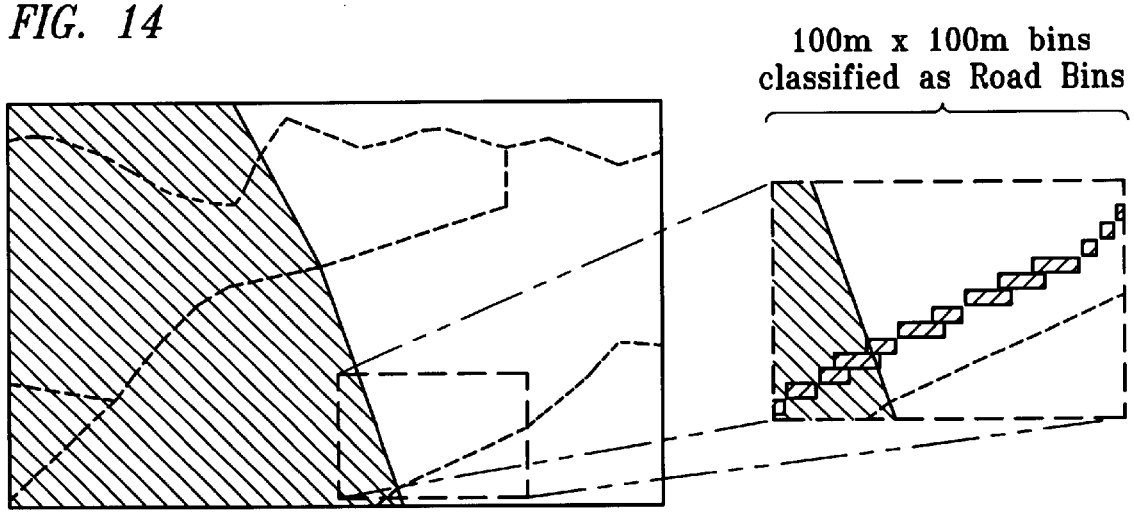

FIG. 14 depicts a sample area with road coverage and 100 meter×100 meter bins that are classified as road bins.

Figure 15:
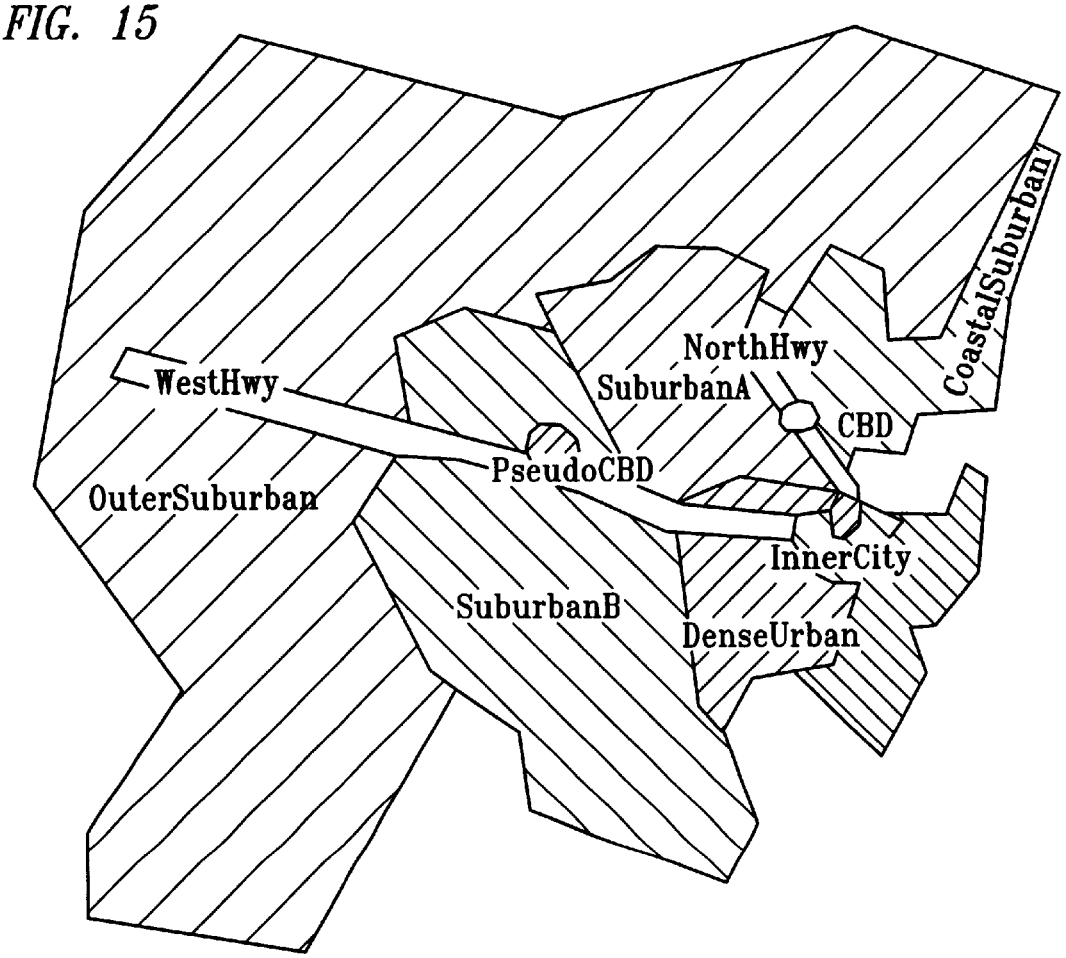

FIG. 15 depicts an example of how the area covered by the wireless network is categorized into demographic regions. Data usually associated with the regions are subscriber growth and/or BTS growth. The various categories are also used in estimating call originations on road bins versus general bins. For example, if the BTS is classified as a highway BTS, then most likely call originations will occur on the road.

Figure 16:
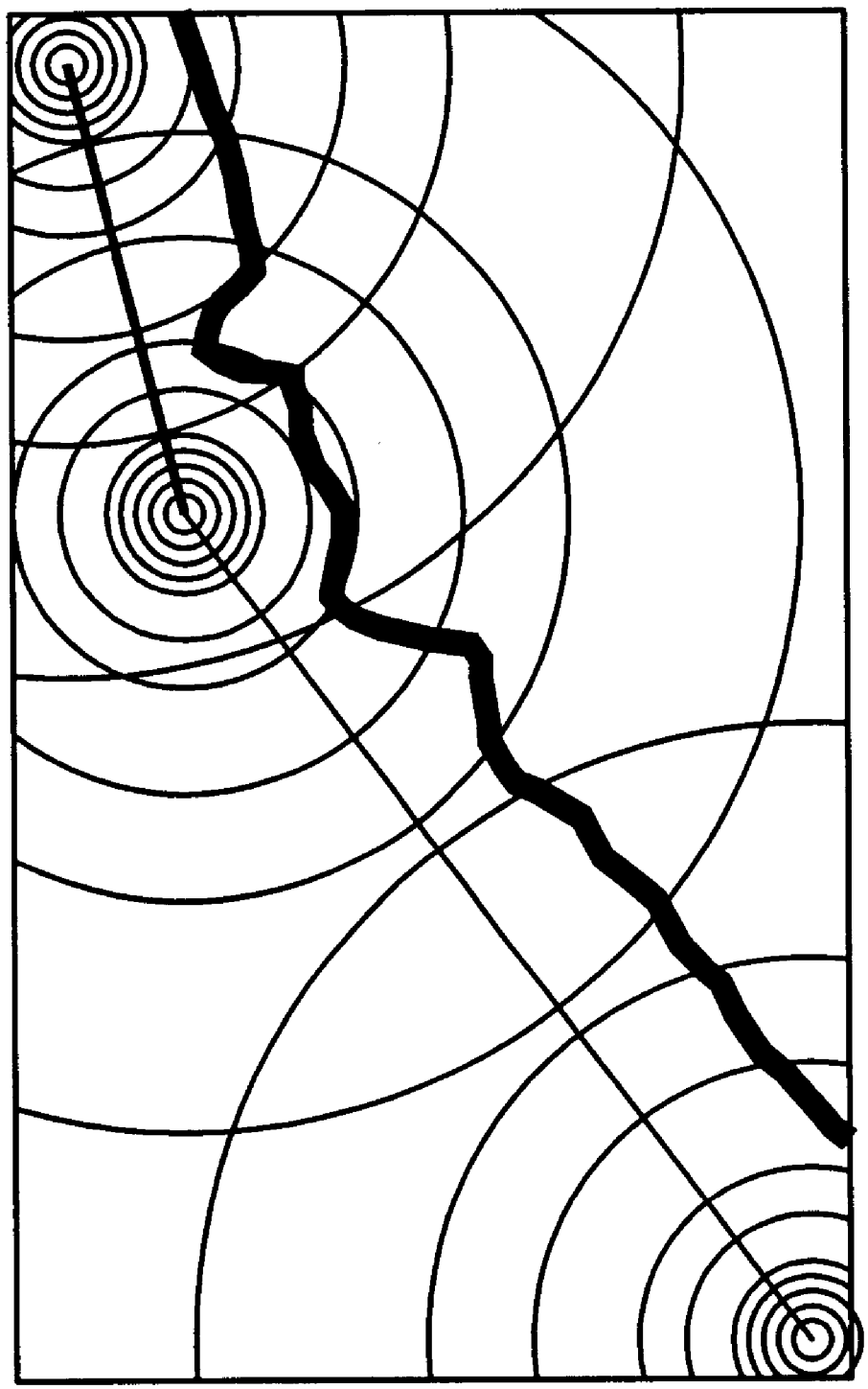

FIG. 16 depicts a sample area with road coverage and handover vectors. Within a class, road bins can be associated with handovers based on proximity to the handover vector. Handover vector counts can be used to weight the demand on the road bins accordingly.

Figure 17:
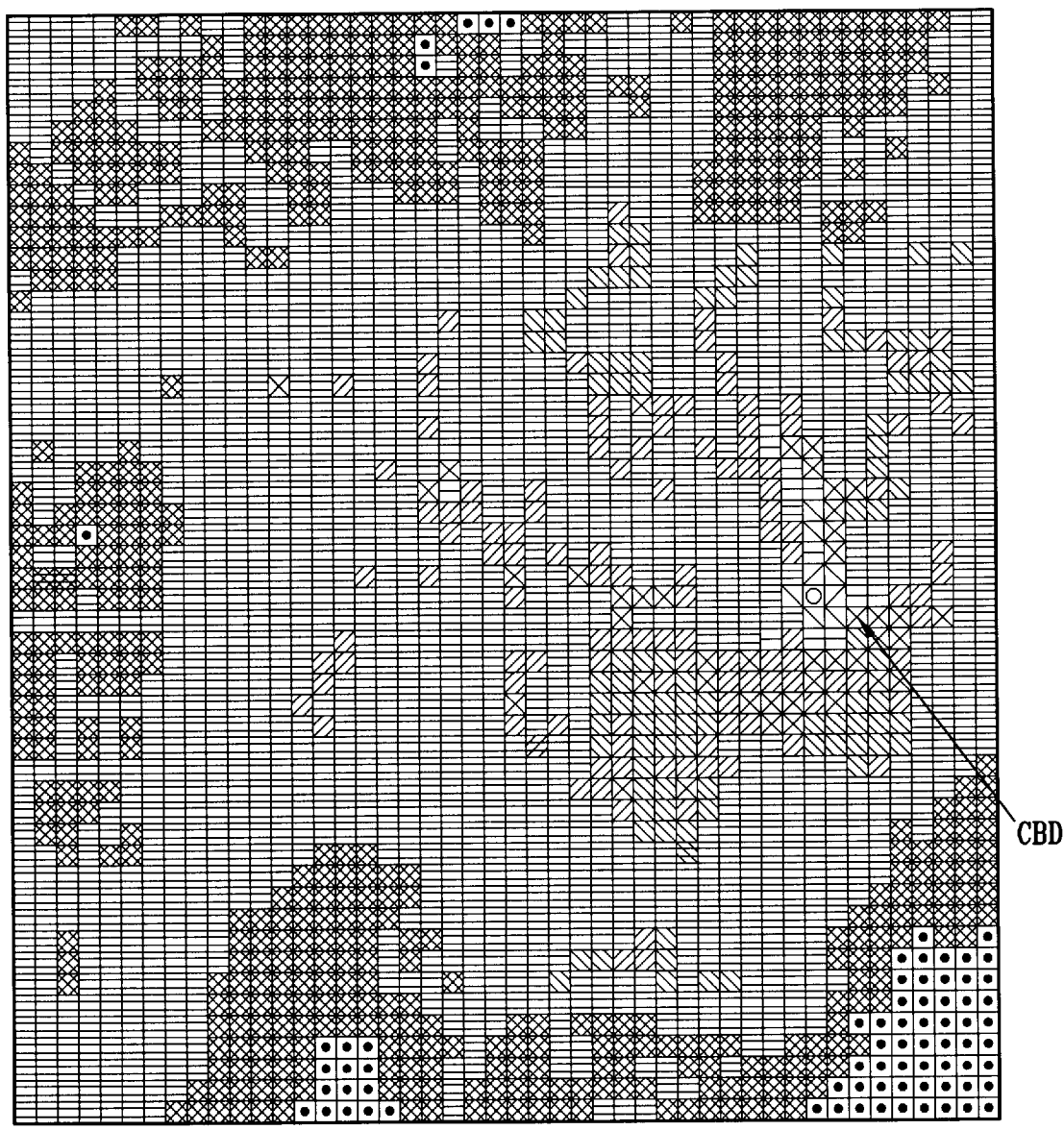

FIG. 17 displays preliminary results for the Sydney area of the Optus network. Each pixel of the map represents the traffic seen in a 10×10 grid of 100 meter×100 meter bins.

A. Detailed Description of Major Algorithms

1. Bin Demand Estimation Algorithm

Figure 18:
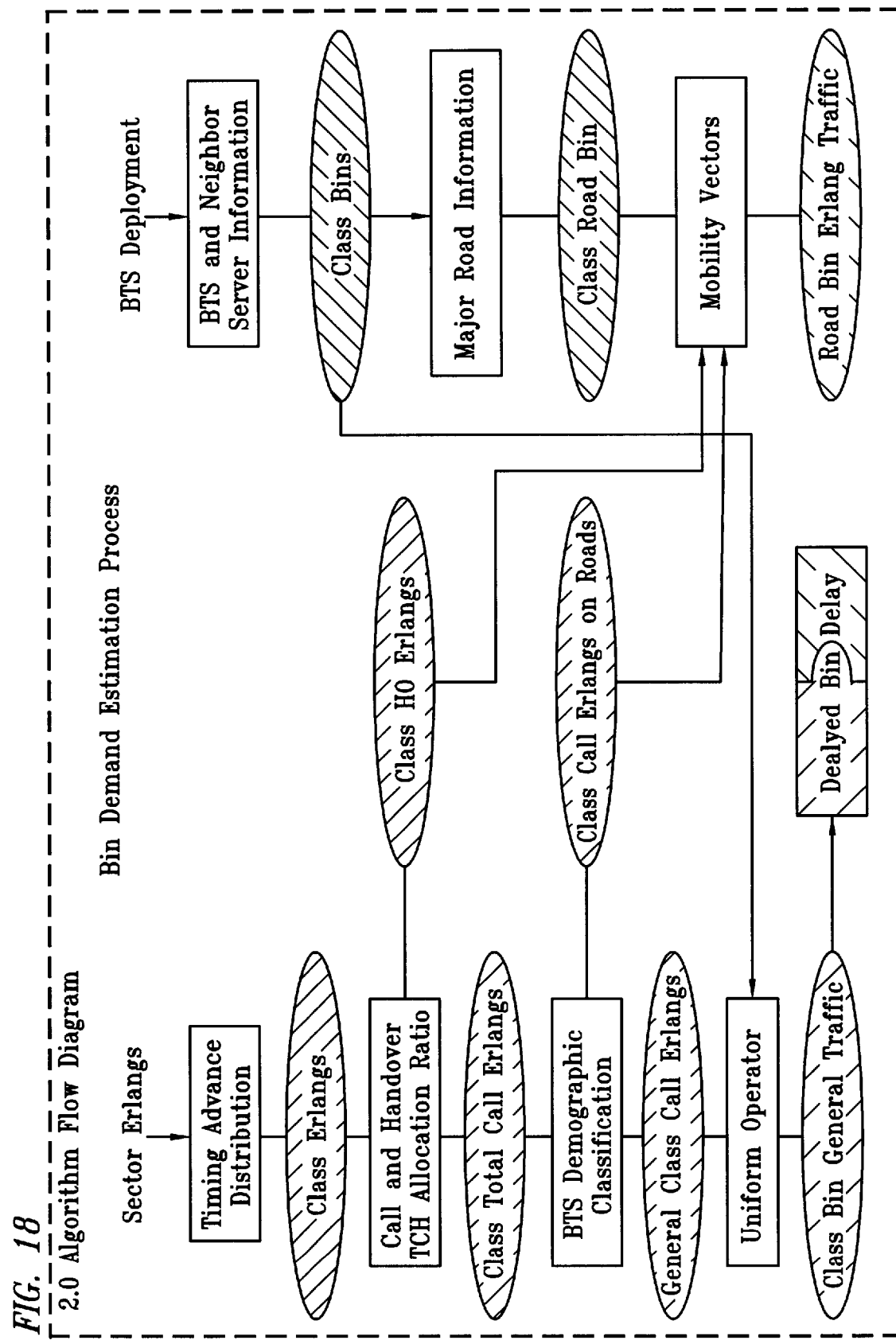
Figure 19:
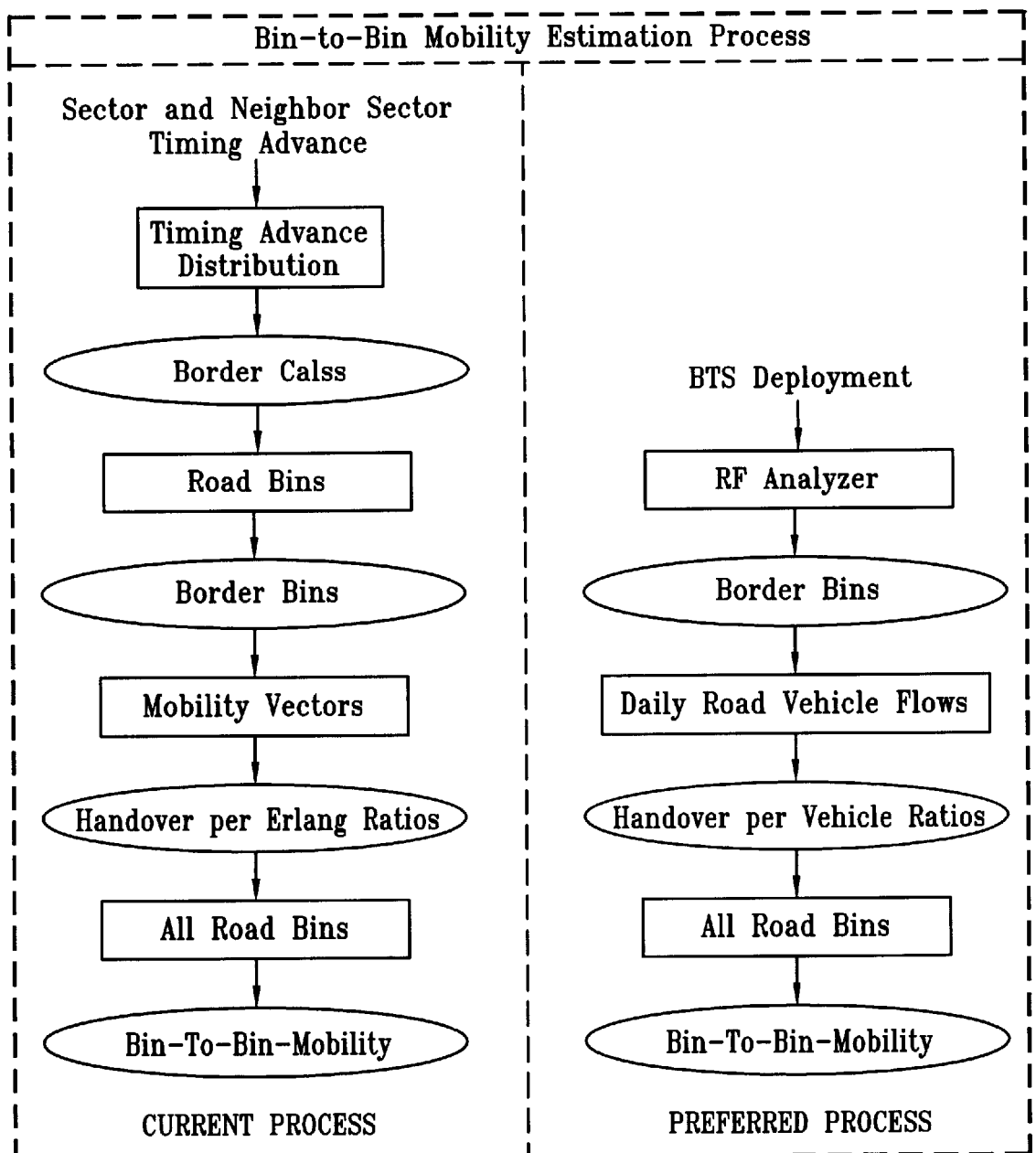

FIGS. 18 and 19 are flow diagrams illustrating the process by which bin demand and bin-to-bin mobility are estimated. The first process is to determine demand in units of Erlangs at the bin level. This demand will be used for BTS TRX dimensioning at the BTS level, and for event demand, such as calls, at the BSC and MSC level.

Inputs to the Bin Demand Estimation Algorithm

Figure 20:
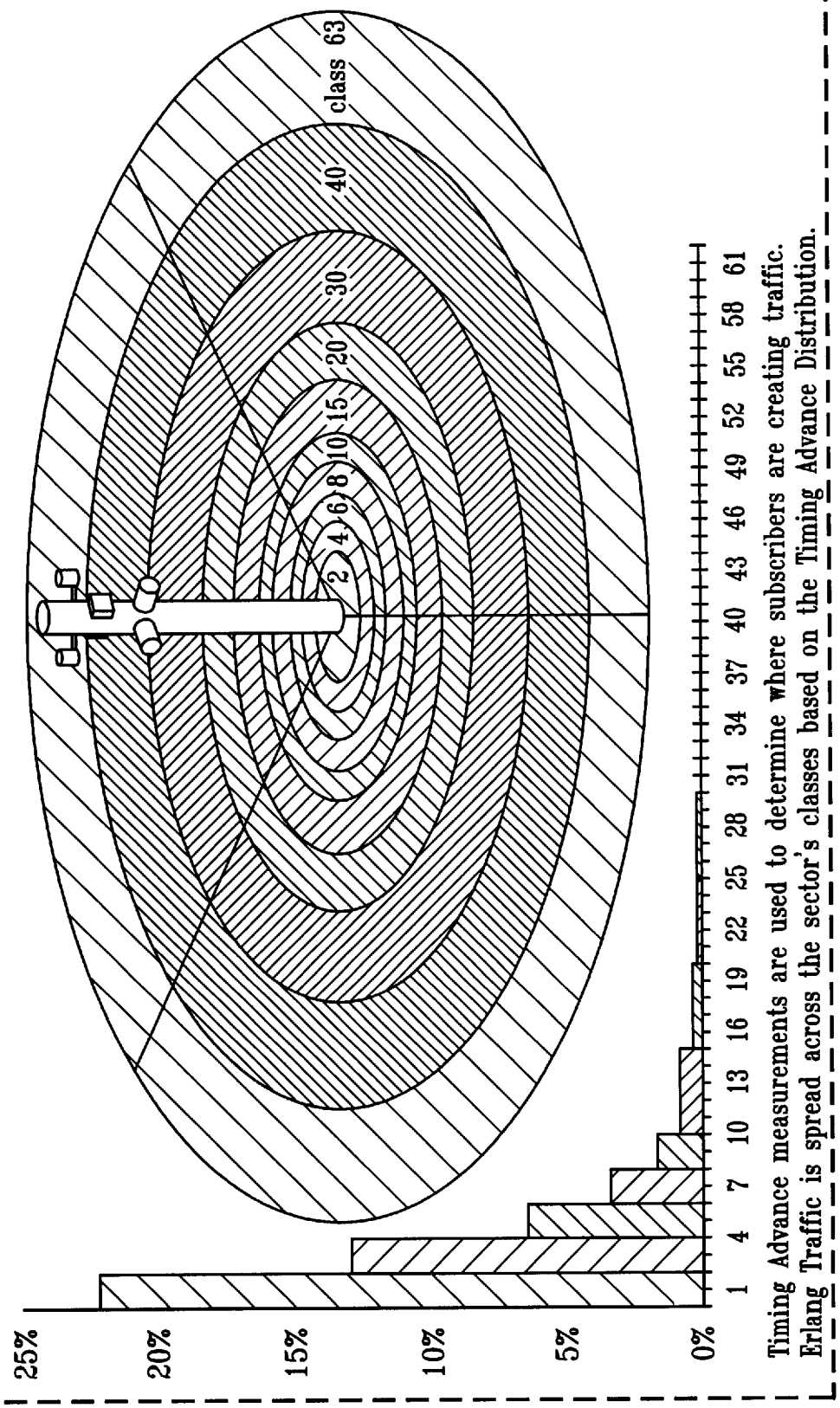

1. Timing Advance OMs—e.g., creation of timing advance classes 2, 4, 6, 8, 10, 15, 20, 30, 40, 63 is shown in FIG. 20.
2. Traffic Channel Allocation and Usage OMs—e.g., is obtained from call attempts and is equivalent to a total number of traffic channel (TCH) allocations during an hour, for Successful Mobile Originated and Mobile Terminated Calls; and from Handover Attempts, including the total number of TCH allocations during an hour for successful incoming handovers
3. Handover OMs—e.g., successful handover pairs for all neighbor cells for each BTS
4. Deployment Modeling (Antenna Position and Orientation)
5. BTS Locations
6. BTS Sector Orientations
7. BTS Sector Antenna Types
8. BTS Demographic Locations
9. Road Vector Data
2. Methodology The first step of this process is to take the Erlangs measurement for a sector and distribute it to each of the timing advance classes. The distribution is based on the timing advance measurements for each of the classes.

$$ClassErlangs_i = \frac{TimingAdvance_i}{\left(\sum_j TimingAdvance_j\right)} \times SectorErlangs$$

The next step of this process is to take the class Erlangs and determine the amount of Erlangs due to normal TCH allocations and the amount of Erlangs due to TCH allocations for handovers. The distribution is based on the TCH measurements.

$$CallErlangs = \frac{NormalTCHAllocations}{NormalTCHAllocations + HandoverTCHAllocations} \times ClassErlangs$$

$$HandoverErlangs = \frac{HandoverTCHAllocations}{NormalTCHAllocations + HandoverTCHAllocations} \times ClassErlangs$$

One of the assumptions made in this algorithm is that HandoverErlangs occurs on the major roads. There are also Erlangs on these major roads due to initial subscriber movements within the sector. We use the demographic information of the BTS to estimate what percentage of CallErlangs occurs on the major roads. For example, if a BTS is serving a highway, then it is more likely to observe more CallErlangs on the roads than in some other area. For a BTS serving a suburban area, this percentage of CallErlangs on the major roads should be less.

$$GeneralCallErlangs = (1 - DemographicFactor) \times CallErlangs$$

$$BinGeneralErlangs = \frac{GeneralCallErlangs}{NumberOfServedBins}$$

$$RoadCallErlangs = DemographicFactor \times CallErlangs$$

$$MobilityErlangs = HandoverErlangs + RoadCallErlangs$$

We now have two values of Erlangs within a timing advance class. They are MobilityErlangs and GeneralCallErlangs. These two types of Erlang traffic will be distributed over the bins of a timing advance class. The GeneralCallErlangs will be distributed uniformly over the bins served in the timing advance class. The MobilityErlangs will be distributed over the major road bins within the timing advance class based upon a road weight for the mobility bin. Since we do not have vehicle flow information for the major roads, these road weights are being artificially created based on proximity to handover vectors and their handover counts. The following equations depict the method of obtaining the road bin weights within a timing advance class.

$$\Omega_{cell} = \min\left(\frac{\pi}{2}, CellWidthInRadians\right)$$

$$\Delta_{neighbor} = \frac{\|cell, neighbor\|}{2}$$

$$\omega_{(neighbor, bin)} = \phi_{neighbor} - \phi_{bin}$$

$$\delta_{(neighbor, bin)} = \|bin, handover\|$$

$$RoadWeight_{(neighbor,bin)} =$$
$$\cos\left(\frac{\pi}{2} \times \frac{\omega_{(neighbor,bin)}}{\Omega_{cell}}\right) \times \cos\left(\frac{\pi}{2} \times \frac{\delta_{(neighbor,bin)}}{\Delta_{neighbor}}\right) \times HandoverCount_{neighbor}$$

$$RoadWeight_{bin} = \sum_{neighbor} RoadWeight_{(neighbor,bin)}$$

$$RoadWeight_{bin} = \frac{RoadWeight_{bin}}{\sum_{bin} RoadWeight_{bin}}$$

$$BinMobilityErlangs = MobilityErlangs \times RoadWeight_{bin}$$

$$BinErlangs = BinGeneralErlangs + BinMobilityErlangs$$

3. Outputs

The output is the Erlang demand estimation for every bin. At the moment, the demand for a grid of 10 by 10 bins is aggregated into one pixel for display purposes in a third-party software.

B. Bin-to-Bin Mobility Estimation Algorithm

The second process is to determine subscriber movements at the bin level. This mobility will be used for mobility event estimation at the sector, BSC, LAC and MSC levels.

1. Inputs

1. Timing Advance OMs
2. Handover OMs
3. BTS Locations
4. BTS Sector Orientations
5. BTS Sector Antenna Types
6. Road Vector Data 2. Methodology The first step of this process is to estimate on which bins do the incoming handovers occur for each sector of each BTS. An assumption in this methodology is that incoming handovers occur on the major roads. Normally we would use received power level information at the bin level to estimate handover boundaries by creating equal power level boundaries for each of the sectors. Since we do not have this data, we will estimate these boundaries from timing advance data by creating equal timing advance boundaries. For each sector and neighbor sector pair, one of the timing advance classes of the sector will contain this boundary.

$$BorderClass = SectorTimeAdvanceClass(\overline{x})$$

$$\frac{\sum_{i=0}^{SectorTimeAdvanceClass(\overline{x})} SectorTimeAdvance(i)}{\sum_{i} SectorTimeAdvance(i)} \leq$$

$$\frac{\sum_{j=0}^{NeighborTimeAdvanceClass(\overline{x})} NeighborTimeAdvance(j)}{\sum_{j} NeighborTimeAdvance(j)}$$

$$\frac{\sum_{i=0}^{SectorTimeAdvanceClass(\overline{x})+1} SectorTimeAdvance(i)}{\sum_{i} SectorTimeAdvance(i)} \geq$$

$$\frac{\sum_{j=0}^{NeighborTimeAdvance(\overline{x})-1} NeighborTimeAdvance(j)}{\sum_{j} NeighborTimeAdvance(j)}$$

The road bins within this timing advance class will be considered as border bins for the sector. For sectors that belong to the same BTS, the road bins that are within some distance parameter of the orientation border will also be considered as border bins.

The second step is to determine a mobility characteristic for each BTS that describes the number of subscriber movements that occur with respect to the mobility Erlangs in the border bins of the BTS. For each BTS, this characteristic is a ratio of the sum of incoming handovers to the BTS with respect to the sum of the mobility Erlangs on the border bins of the BTS.

The last step is to project the number of incoming subscriber movements from neighboring or adjacent bins for each of the road bins. For each sector that is serving a particular road bin, the mobility to Erlang ratio for the BTS is used to multiply the mobility Erlangs of the road bin to determine an estimate of subscriber movements into the road bin. These movements are assumed to be incoming from neighboring or adjacent road bins. The distribution of these movements is based on the position of the road bin with respect to the BTS location, and also the individual mobility Erlangs of the adjacent road bins. For each possible movement into the road bin, the contributions are summed up to give an estimate of the number of subscribers moving into the road bin while making a call.

Preferably, at least two sets of OM data will be utilized in generating demand and mobility estimates. Each set of OM data will preferably be taken during the same time period during separate weeks, within a few weeks of each other. Preferably, the second set of data is collected after additional sites have become operational. Two analyses will preferably be performed with the same simulation parameters. Statistics are preferably compiled on a per bin basis. Simulation parameters will be fine-tuned to minimize differences in bin traffic.

II. Densification and Optimization

A densification module interfaces with the Referenced System to provide data concerning carrier allocation and cell-splitting. The densification module is a stand-alone program, but can be incorporated in the Referenced System. The approach is to translate the new demand to a green field problem. This is achieved by removing that part of the traffic demand which is already covered by the existing sites in the system. Then, an optimized site plan for the remaining traffic demand is found as before.

The densification and optimization processes are described in Appendices B and C hereto, which are incorporated herein by reference for all purposes.

Figure 21:
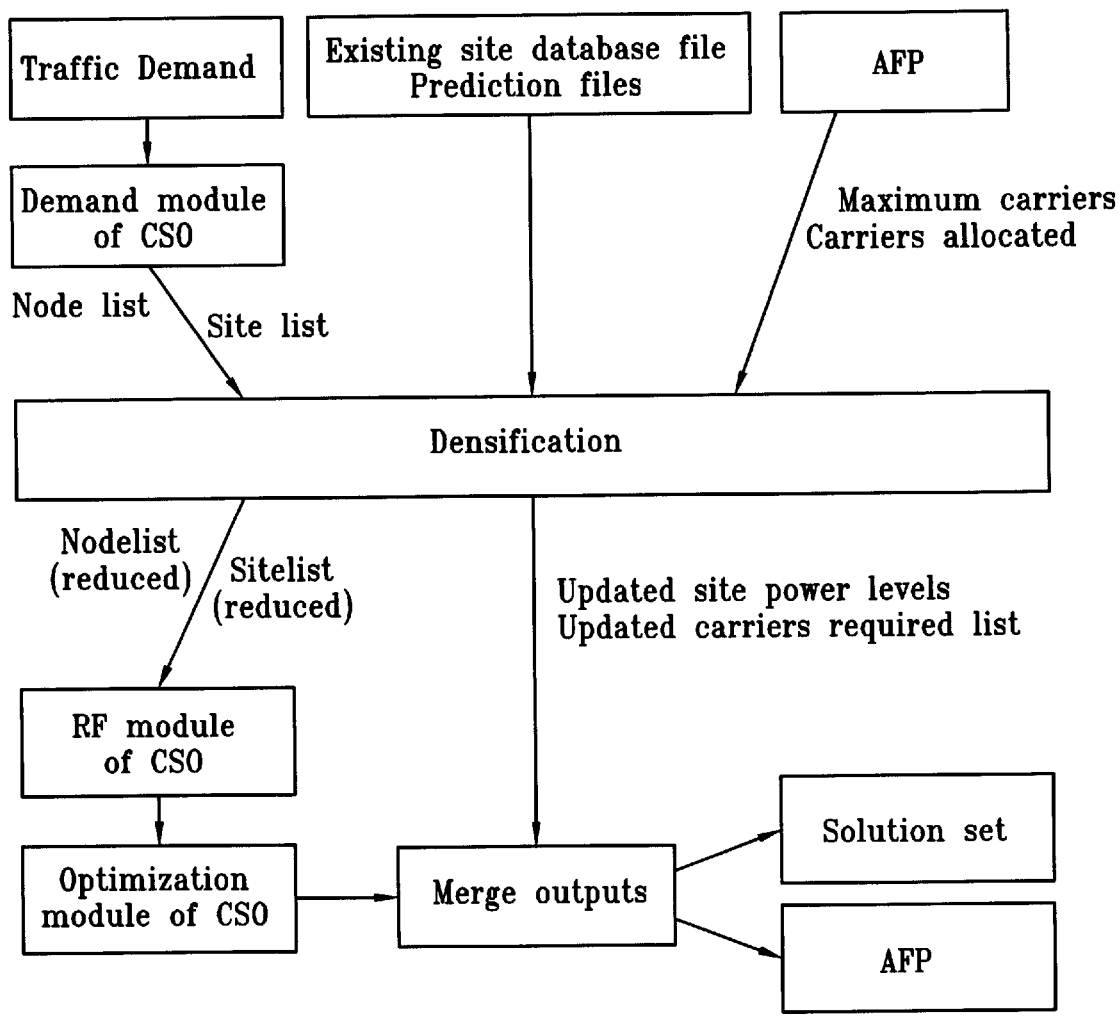

As shown in FIG. 21, the densification module determines the demandnodes covered by the existing cell sites. This is determined using as limitations on traffic capacity a maximum traffic threshold (or limit) and a minimum coverage threshold (or limit). The maximum traffic threshold is derived based on transceiver limitations and channel allocations available from the associated BTS. The maximum traffic threshold is selected to provide a grade of service ("GOS") within acceptable network limits. The minimum coverage threshold is equivalent the least power that can be received by the MS subscriber and still satisfy quality of service ("QOS") requirements. The minimum coverage threshold is determined from a link budget and best server predictions. Typical coverage thresholds include "in-street" (−80 dBm), "in-car" (−72 dBm), "in-building" (−67 dBm), and "central business district" (CBD) in building" (-65 dBm).

Existing cell sites are then split by reducing the transmitted power, until each site provides GOS and QOS to each node considered "covered" within acceptable network. standards. In other words, the coverage area of the existing cell sites is reduced by such "cell splitting" until the traffic handled by the site is reduced within the maximum traffic threshold value and each road within the covered area is expected to receive a signal having a power level above the minimum coverage threshold value.

The densification module then updates the power level and transceiver allocation data at the existing sites to the values determined by the cell-splitting algorithm.

The densification module then creates an uncovered node list by removing nodes from the traffic map that are covered by existing sites, when the updated power level and transceiver allocation data is applied to each site.

A. Architecture Description

This will be an added feature for the cell site planning tool, which makes it more versatile and adaptable for a growing network.

B. Programming Description

FIG. 21 shows the interaction between the Densification application and other applications. The Densification application consists of two parts; the densification part and a merging part. The Densification part is run by Densific—d, while the merging part is run by Densific—m. The densification program should be seen as an extension to the existing CSO application (cells site optimization). Densification can be used when an existing cellular mobile system is getting overloaded; i.e., the capacity given by the existing cell sites is insufficient for carrying the actual traffic in the system. So before running Densification, one must have an existing system in Planet (or at least the needed information given in the same format as the output from Planet). Although the Planet system is referenced herein, it will be apparent that other similar systems and available databases can be employed.

1. List of existing cells: This file can be created in Planet by printing cells to a file, in the site database control or in the RF module of the Referenced System.

2. Prediction files for the existing cell sites: In Planet, these files are created by running the prediction tool for the existing cell sites, and is also available from the RF module of the Referenced System.

3. Traffic file: This file contains information about the traffic density in the area divided into bins. This should be the expected new traffic (or the current traffic, which is likely overloading at least a portion of the system).

4. Carrier file: The information about how many carriers there is allocated to each cell site should be located in this file, and is available from the RF module of the Referenced System.

The first thing to do as part of the densification procedure is to run the Demandmodule of the Referenced System. This should be done both for demandnodes and for potential cell sites. At this point, the system is treated as if it should be dimensioned from scratch. Then the densification program must be invoked. The output from the densification is then used as input to the radio frequency module of the Referenced System. After calculating the coverage for each potential site in the RF module, the optimization module is run to find the best subset of all the potential sites to cover the demandnode.

The merge output part is made as an independent program which is able to merge information from to existing site databases into one new.

C. Algorithm 1

The algorithm considered in this section is only the densification part. FIGS. 22A through 22H include a flowchart of the program, including an indication of information as read from different files. It should be noted that only new procedures are described in this document. Other procedures are also used, but as they were developed for other programs, any interested reader is referred to the author of the procedures.

The main component of the algorithm is a vector V giving information about the coverage of the demandnodes in the system (|V|=number of Demandnodes). Each element i in the vector is a list of the cells which covers demandnode i. The individual elements in the list is ordered so the first element corresponds to the sector which gives the best coverage of the demandnode. At the present time, the best coverage is defined to be determined by the received powerlevel from the site.

The figure shown below is an example of the list of two nodes i and j in the vector:

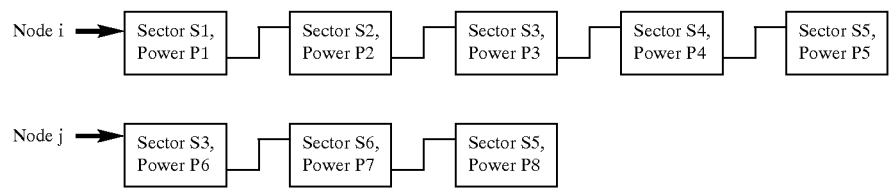

Node i is covered by five different sites, while node j is covered by three sites. The main algorithm can be described by the following:
1. Calculate traffic in each sector. This is done by adding up traffic from all demandnodes covered by the individual sectors.
2. Check for each sector if the traffic is higher than a given threshold. If so, decrease the power for the sector(s), and update the coverage lists for the demandnodes.
3. If any sectors had the power reduced in 2, then go to point 1; otherwise end the algorithm.

The figure below is identical to the previous one, except the emitted power from Sector S3 has been decreased:

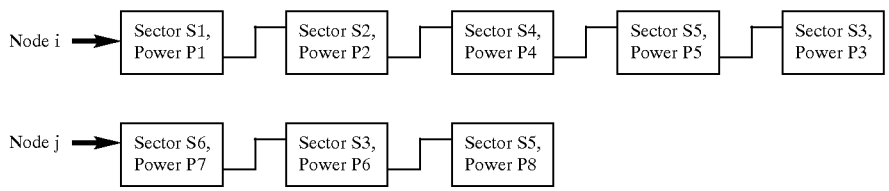

This means the powerlevel from sector S3 at node i is reduced from P3 to P3' and the power level at node j is reduced from P6 to P6'. The reduction is, of course, the same for both nodes since it is the emitted power from the site which has been reduced.

A more thorough description of the algorithm can be found in the flowchart of FIGS. 22A through 22H.

It is preferable, however, to assign to each of nodes i and j, as well as all other nodes, the "best server" sector for that node. The "best server" sector is that sector from which the node is expected to receive the highest sequel strength in the downlink. That sector is designated as covering the node. All such nodes are grouped to develop a coverage area.

D. Inputs

The densification part of the application demand three main input files, which may be obtained from any suitable database, including a database of the Referenced System or the Planet system, for example. These are "sitelist," "nodelist" and "Densification_settings." The sitelist and nodelist files in this example are files created by the Referenced System when the demandmodule is run. The settings file must have the following format:

existing site list file: cells.liste antenna directory: /apps7/planet/Warsaw/CONTRAT/antennae prediction directory: /apps7/planet/Warsaw/CONTRAT/predictions prediction resolution: 20

Powerreducing on cellbasis: 1

GSM (0) or TDMA (1) system: 1

Max number of carriers in a sector: 0 carrier file: /apps7/planet/Warsaw/CONTRAT/database/carriers

Blocking_probability: 0.02

Use polygon to power: 1

0:

Number of clutters: 14

Number of conv. Clutters: 4

Clutter conversion: 3 3 3 2 1 0 1 2 1 2 2 3 0 1 clutter to power conv: −64 −74 −84 −84

Clutter conversion: 3 3 3 2 1 0 1 2 1 2 2 3 0 1 clutter to power conv: −64 −74 −84 −84

1:

default power threshold: −84

A file giving the existing cellsites is created from Planet or other available database. It should be noted that the placement (coordinates) of the sites must be given in grid format. Planet gives the posisbility to have the site placement in latitude/longitude format, but this is not supported by densification, because of problems with the identification of the Planet prediction files for the existing sites. This is described later. The antenna directory denotes where the antenna models files can be found. This will normally be the same files which are used by Planet. The prediction directory is the directory in which the prediction files for the existing cells sites can be found. A prediction file contains information about the pathloss from the cellsite position to (x,y) position in an area which is defined when running the prediction in Planet.

Prediction resolution denotes the resolution size of the bins. In the example above, the resolution is set at 20 m×20 m; however, any resolution size may be used. It is preferable that smaller resolution sizes be used rather than larger resolution sizes. This parameter may be the same as is used in Planet.

The last five variables in the settingsfile all have something to do with how the densification is performed.

Figure 23A:
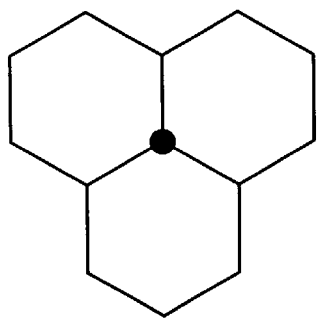
Figure 23B:
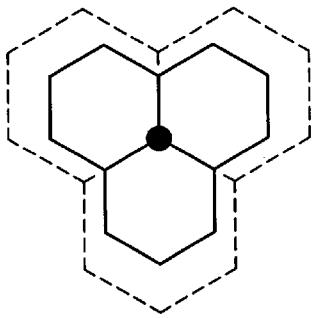
Figure 23C:
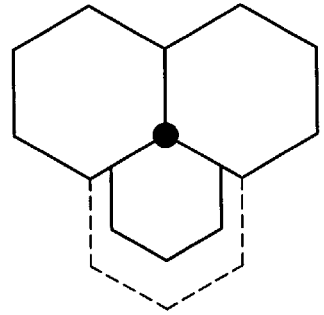
Figure 22A:
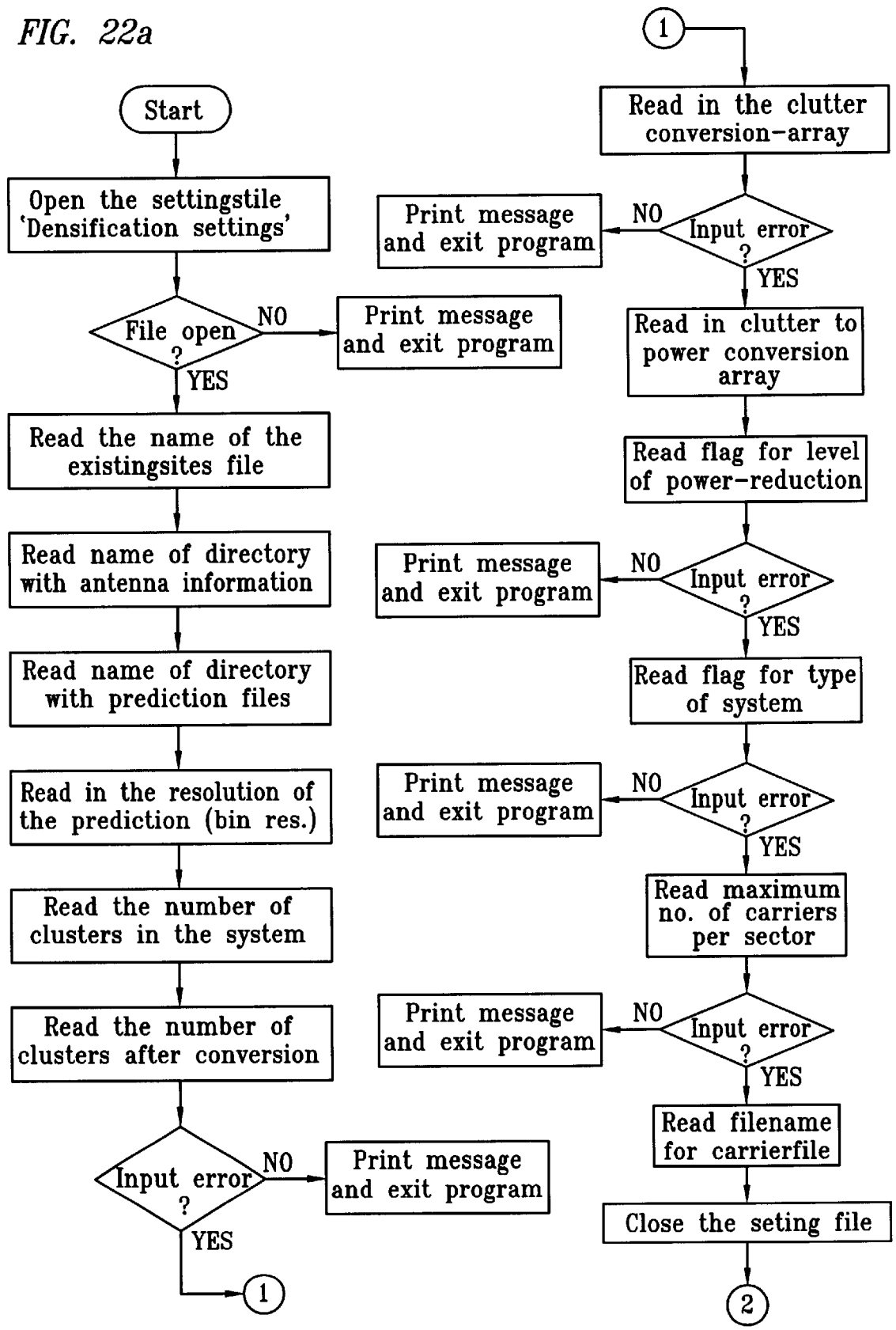
Figure 22B:
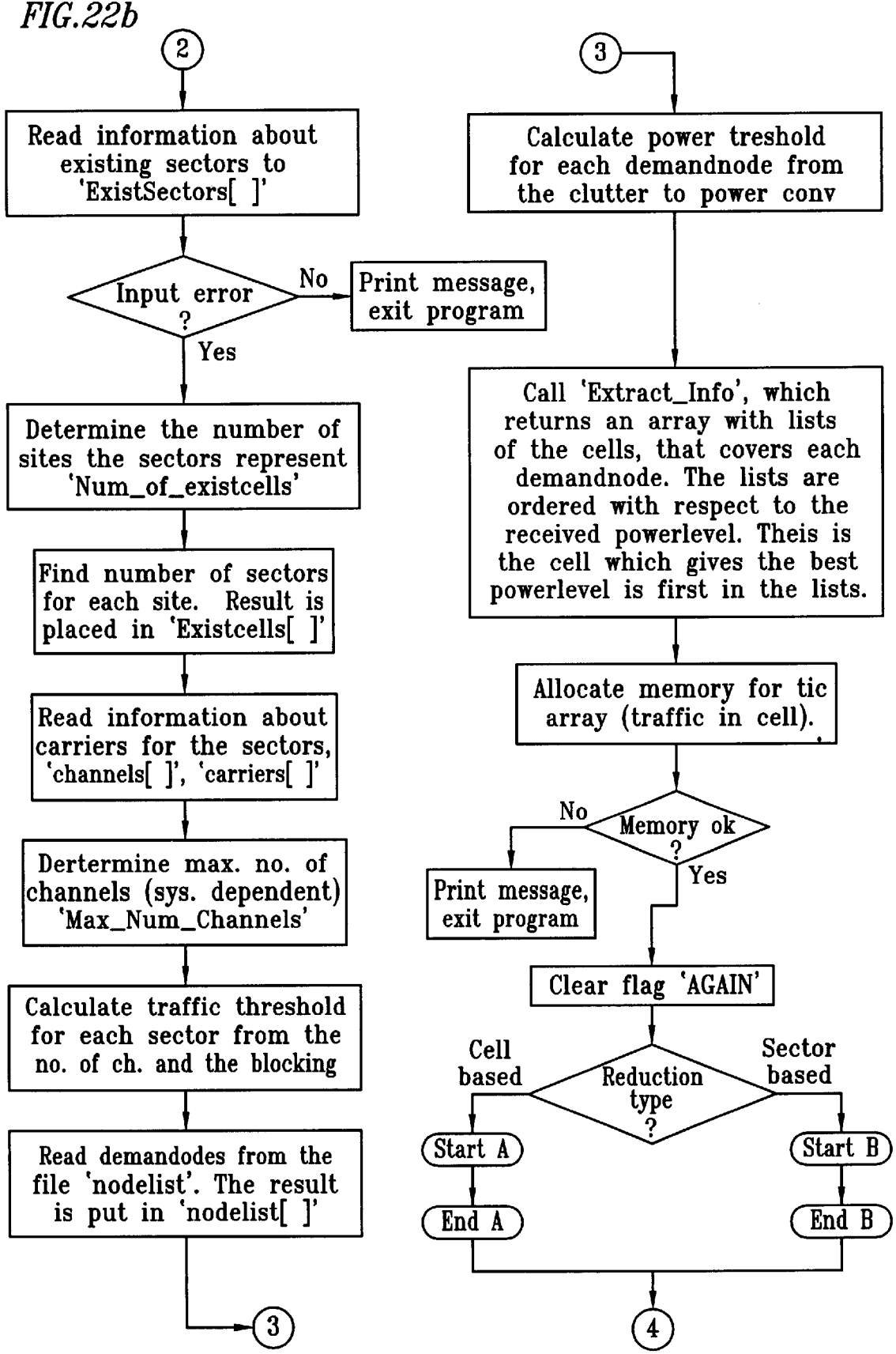
Figure 22C:
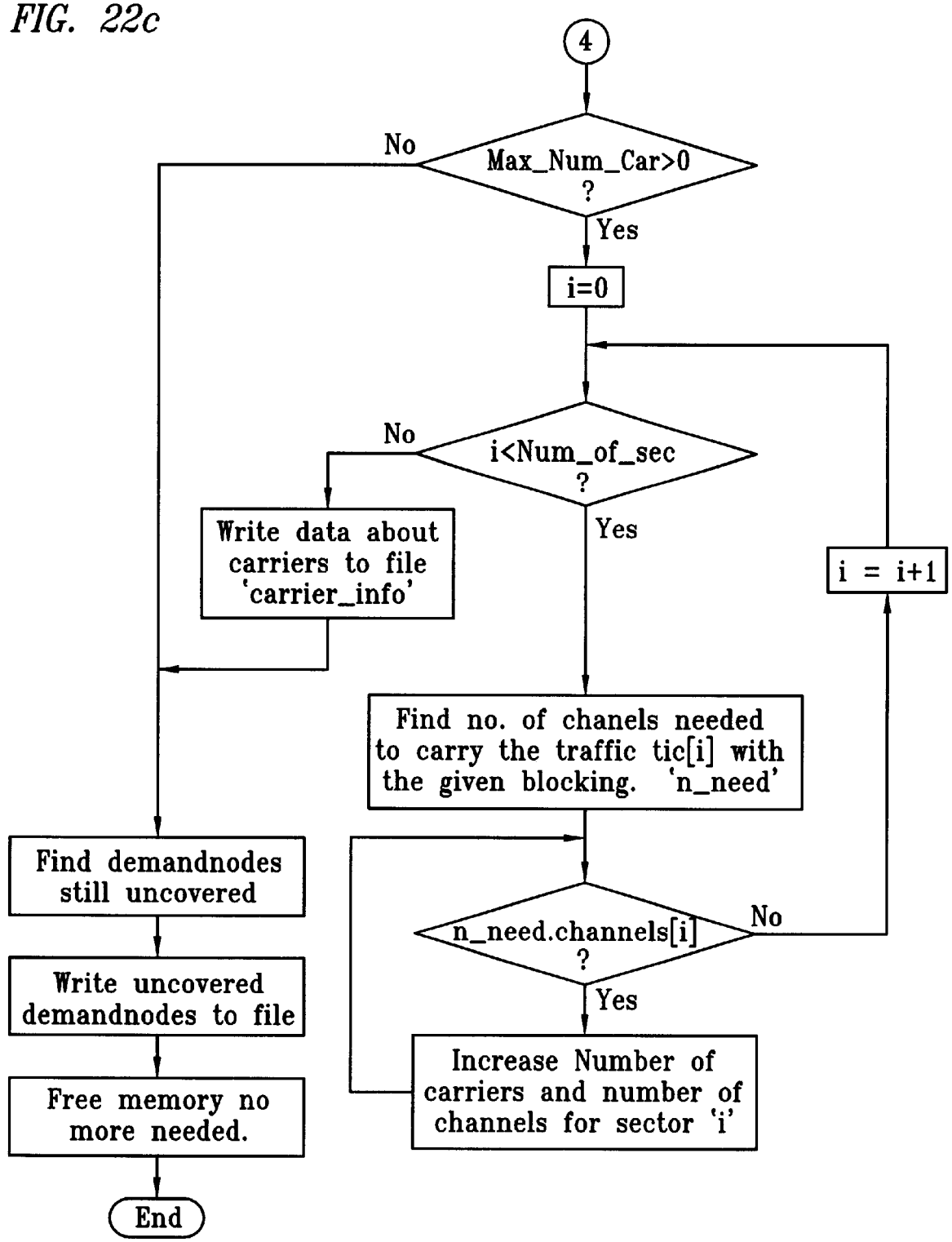
Figure 22D:
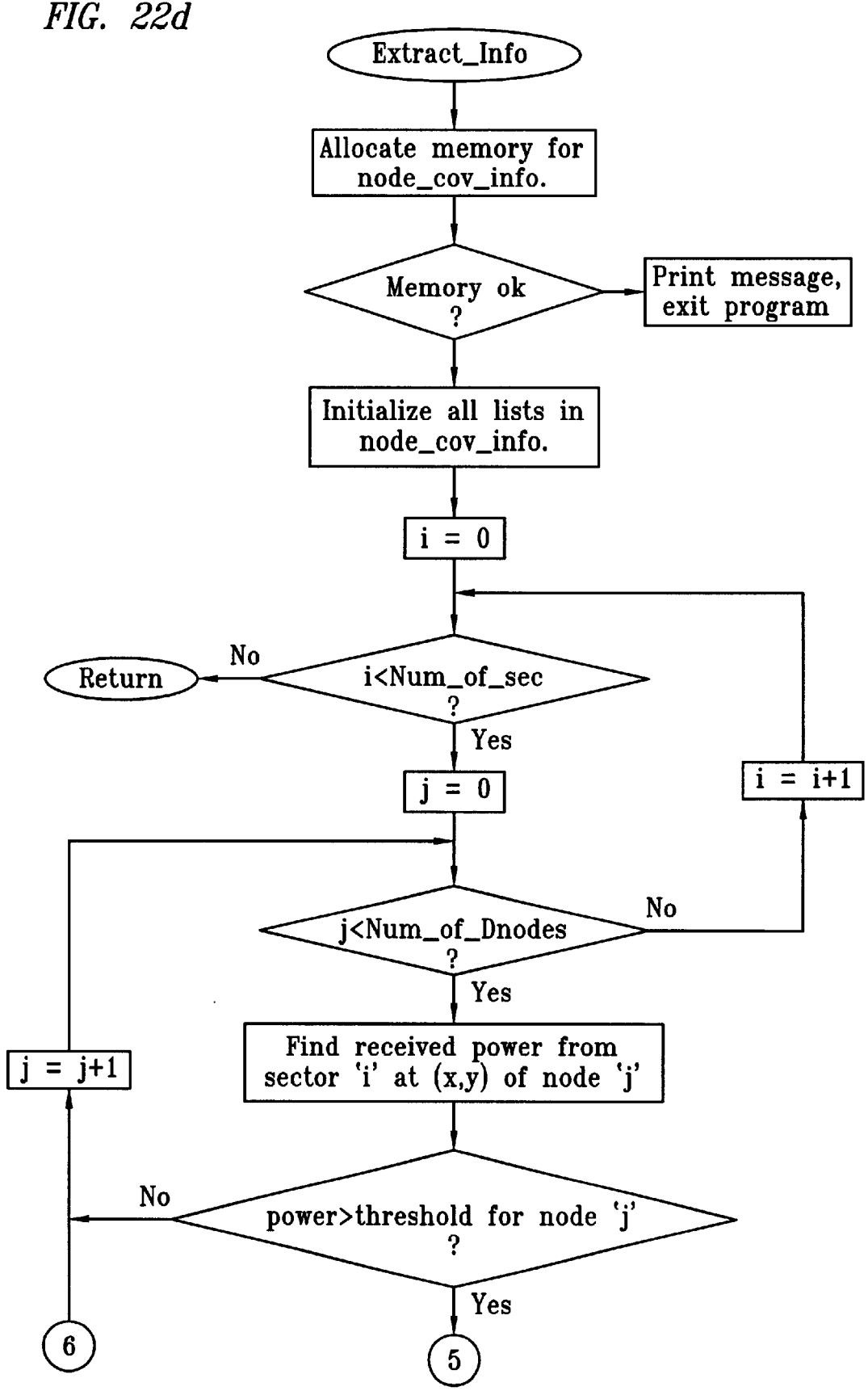
Figure 22E:
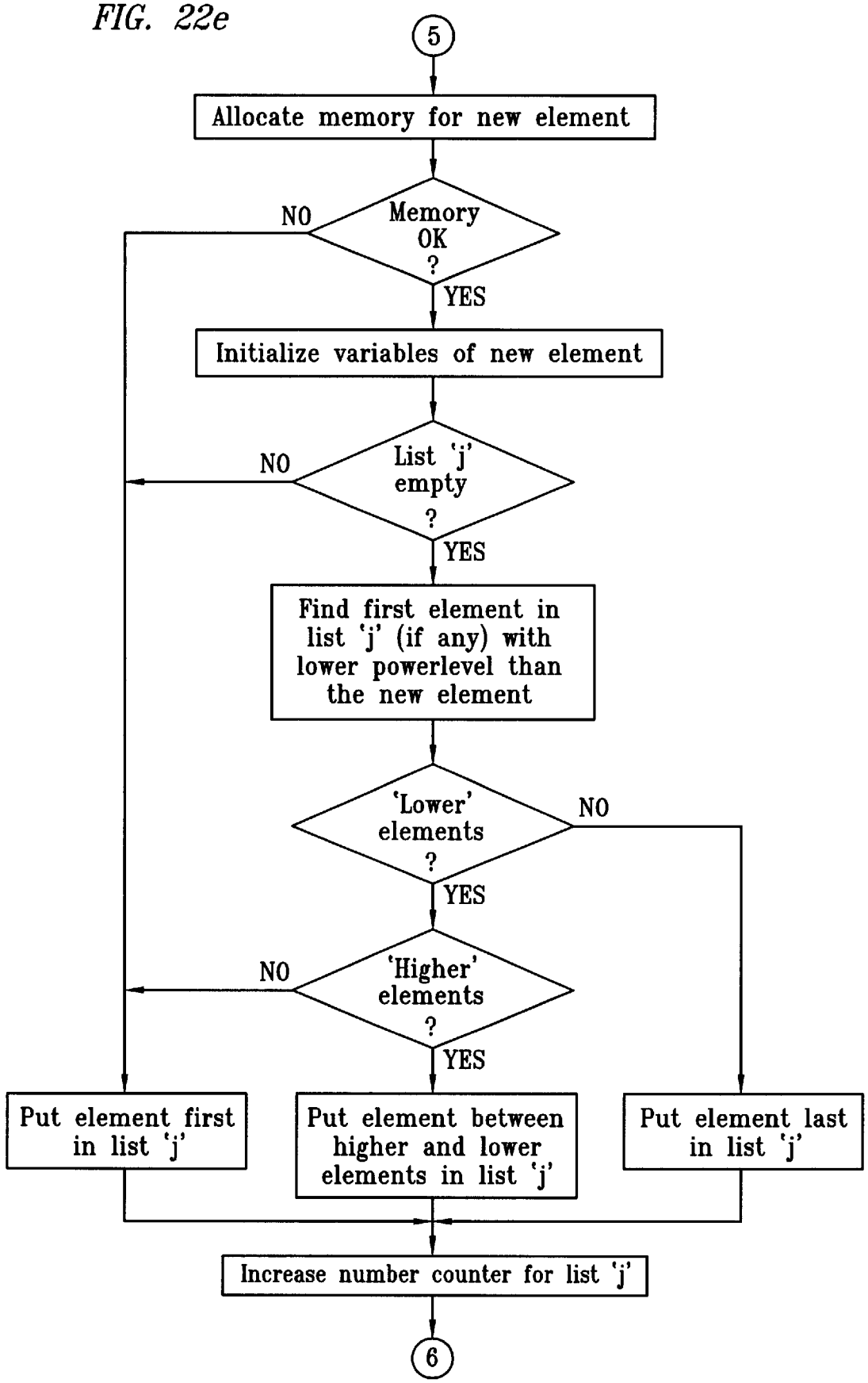
Figure 22F:
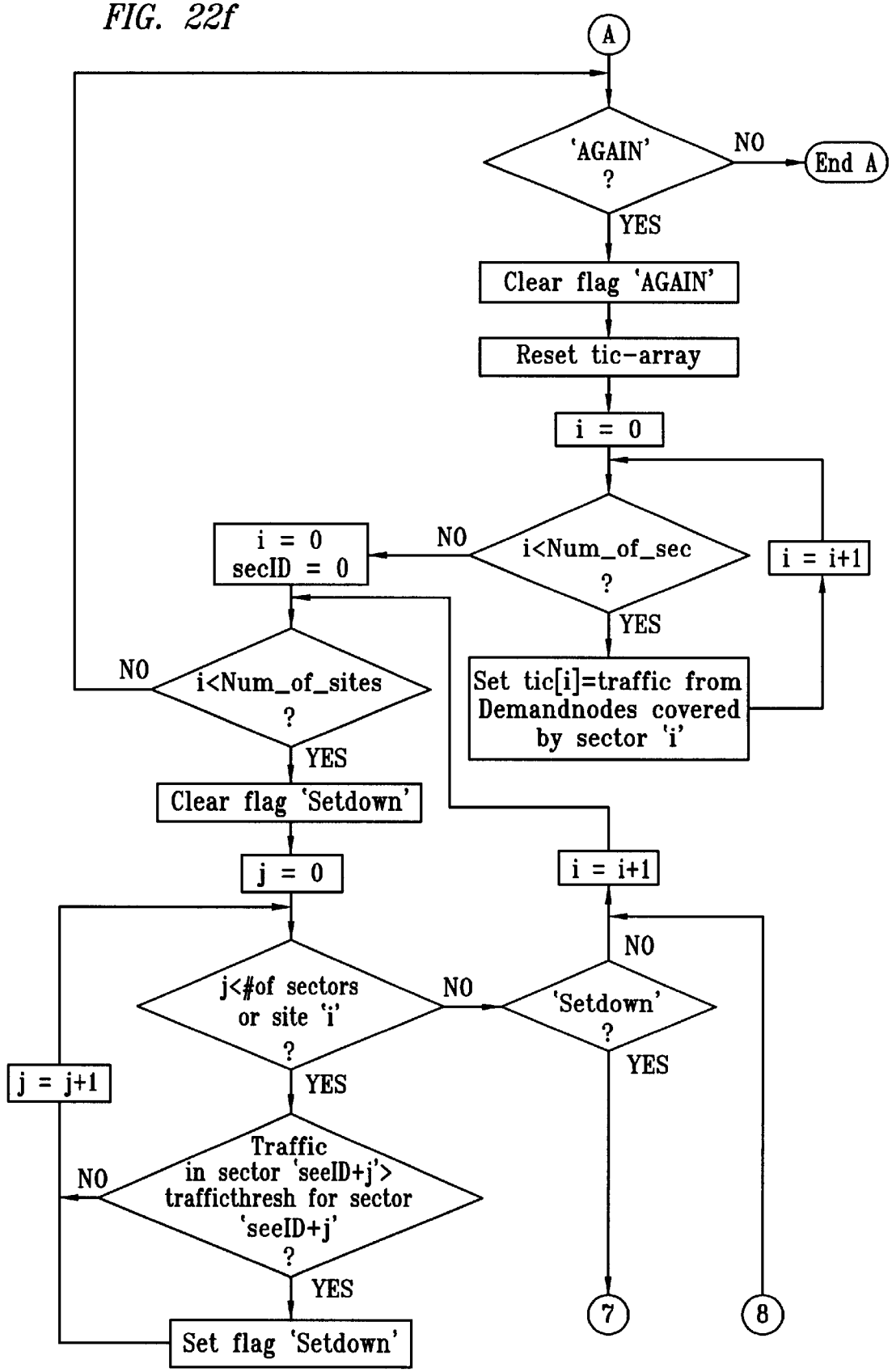
Figure 22G:
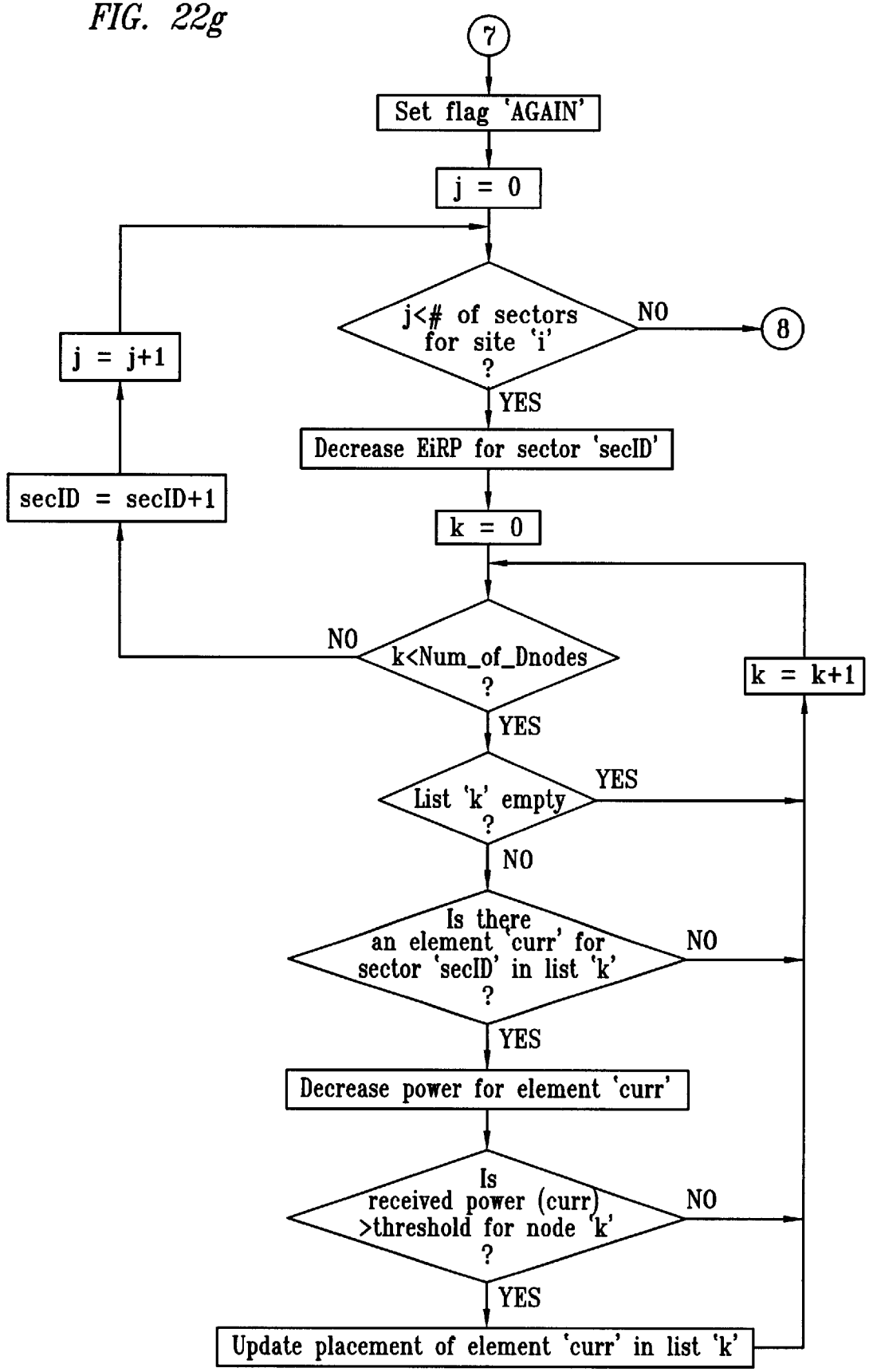
Figure 22H:
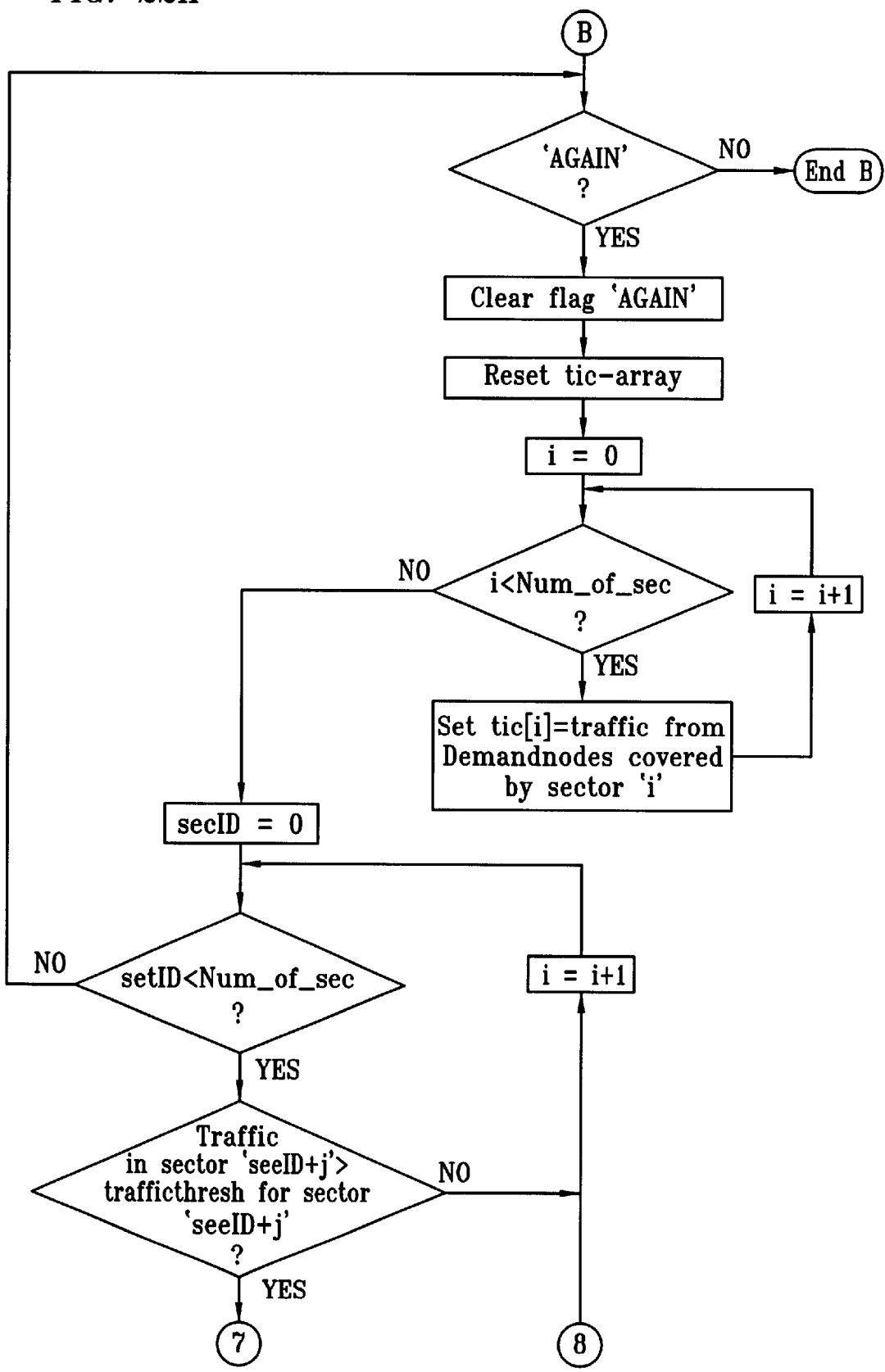

Referring to FIG. 23, the "Powerreducing on cellbasis" is a flag, which denotes if power should be reduced on cell (site) basis (value=1) or sector-basis (value−0), during cell splitting. In the case of cellbased splitting, the emitted power is reduced in all sectors belonging under the same site, even if only one sector needs a powerreduction. In the opposite case, sectorbased splitting only the sectors which actually covers too much traffic will get the emitted power reduced. This makes it possible to have serveral (at most one specific powerlevel for each site) powerlevels at the same site. The difference between cellsplitting on sitebasis or sector basis is illustrated in the above figure. The first part gives the original coverage, while the two other parts show coverage with sitebased and sectorbased powerreduction, respectively.

The next flag in the settingsfiles gives information about which type of system is considered. This is important to know when the number of channels is calculated in the program, and thereby the capacity of each sector. At the time being, the program accepts two types of systems; namely GSM (0) or TDMA (1). This can be extended very easily if needed in a future version of the program; i.e., if information about other systems are available.

The value of Max number of carriers in a sector is used for getting information about how many carriers can be allocated in each sector. If a sector is already allocated the maximum number of carriers, then the only way to improve the quality of service is to decrease the coverage; i.e., reduce the transmitted power. If, on the other hand, a sector is not allocated the maximum number of carriers allowed, then the first way to give a better service is to increase the number of carriers. Note that one carrier is equal to a number of channels (3 in TDMA and 8 in GSM). If the maximum number of channels is given as zero, then it means only the already allocated carriers (channels) can be used. Note: If the maximum number of carriers is not zero, but smaller than the maximum of carriers already allocated to any site, then the program exits; i.e., it is assumed that all sectors can be allocated the same maximum number of carriers (if it is greater than zero).

The carrier file contains information about how many and which carriers is allocated to each sector. It should have the same format as a Planet carrierfile.

The next line of information in the settingsfile is the blocking probability in a sector, which the system should be dimensioned for. The blocking probability is used to calculate the traffic threshold for each sector; i.e., how much traffic that maximum can be carried within one sector and still maintain a blocking probability lower than the given one. It should be noted that the calculation of the traffic threshold is done with the assumption that each sector behaves as an Erlang-B system. That is, each sector is considered as an independent system with arrivals given by a Poisson distribution.

After the blocking probability, another flag is defined. This flag (use polygon to power conversion UPTPC) denotes if the power threshold for coverage is defined by the clutter type (flag=0), in which case four more lines must be present in the settingsfile. These four lines give the following information:

Number of clutters denotes the number of clutters which are considered in the network area. In this example, the terrain types are converted into four clutter types. It will be apparent that any number of clutters may be used in any variety of variations, as desired. Therefore, the original number of clutters must be converted to no more than four. This might be changed in a future version of the Referenced System, where this variable is set in this settingsfile. Clutter conversion denotes how the clutters should be converted; i.e., clutter no. 0 should be treated as 3, clutter 1 as 3, . . . etc. The clutter-to-power conversion gives the minimum powerlevel in a given clutter-type (after conversion), if coverage shall be expected; i.e., if the power in a (x,y) point of a clutter type i is below clutter_to_power_conversion [i], then (x,y) is not covered. The power should be given in dBm.

If the UPTPC flag is set, only one more line is needed in the settingsfile. This is the information about the default power threshold. Besides this, if the UPTPC flag is set, it demands for another file (DENSIFIC_selec_poly) to be present. This file gives information about polygons, where the powerlevel is different than the threshold level, and the format of this file must be:

Polygon Directory: /apps7/planet/Warsaw/CONTRAT/vectors/user/

Deep_indoor000.bin Deep_indoor-64.000000

Polygon Directory: /apps7/planet/Warsaw/CONTRAT/vectors/user/

Windows_indoor000.bin InWindows-74.000000

This is, there are two lines for each polygon which have power thresholds different from the default value. The first line gives the directory where to find the file given in the second line. Besides the filename, the second line gives information about polygonname and power threshold (in dBm).

When the merge part of the application is run (by Densific—m), it is also necessary to give a settingsfile. It must be named "mergesite_settings," and it must have the following format:

list of existing sites: existing_sites.liste
Existing site database: site_db1
New sites database: site_cb_dense_75
Name of merged site database: merged_sites The first file name described is the same as in the other settingsfile, while the rest is new. The "Existing site database" is the database with at least the sites given in the list of the use site. The file is in Planet format, and it should be noted that a site database can contain information about more than just the active sites. The file of "New sites database" is the output from the optimization module of the Referenced System, running on the output from the densification part of the application. The last file name which should be given is the name of the output file; i.e., the name of the merged site database. All files (input and output) are assumed to be in Planet 2.7 format.

E. Outputs

The output from the Densification part of the program is reduced node list, site list and modified site database. The reduced nodelist1 file is a list of the demandnodes which cannot be covered by the existing sites.

Operation of the system to create demand nodes, reconfigure existing cell sites and configure additional cell sites is shown in FIGS. 24 through 31.

Figure 24:
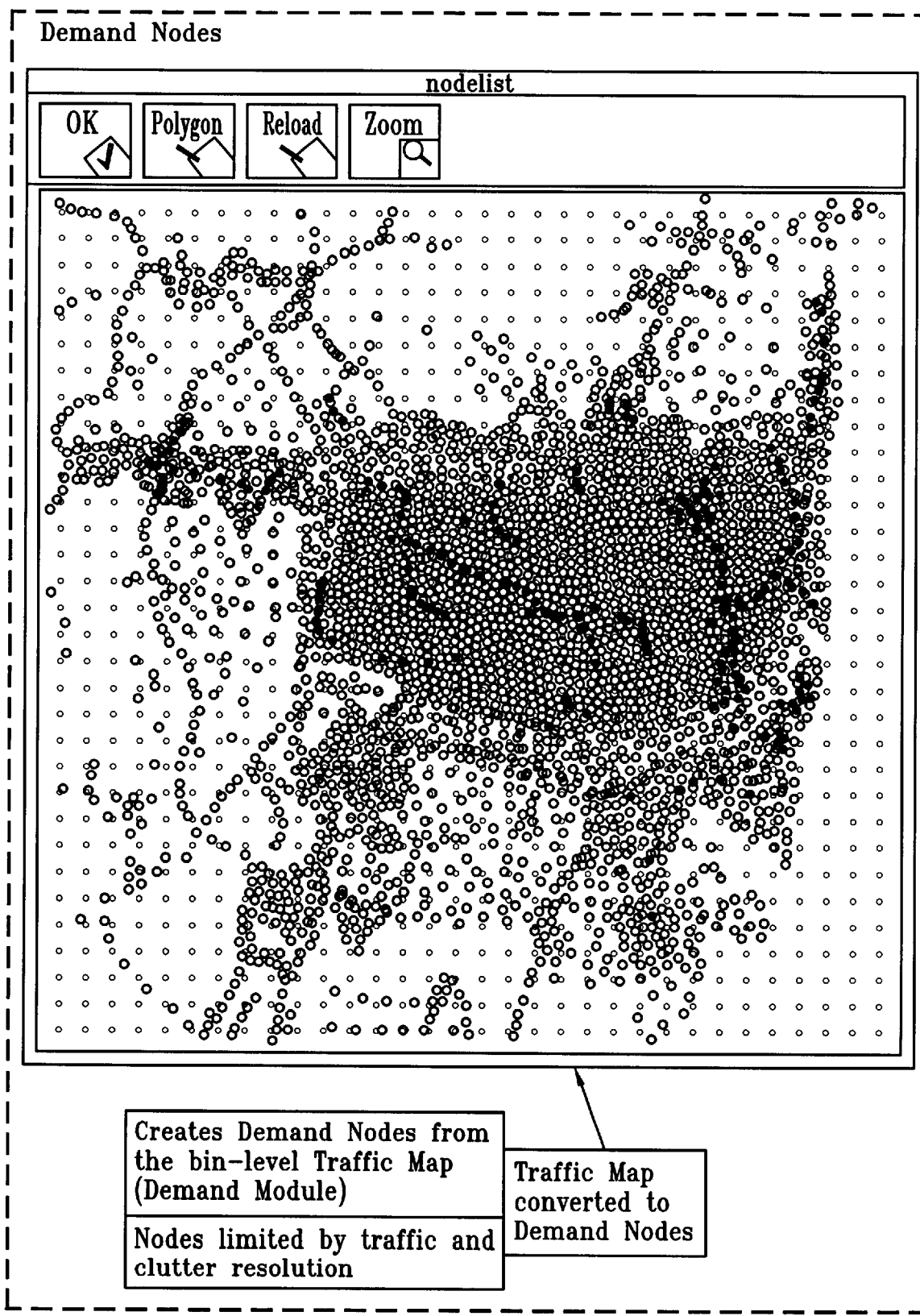

FIG. 24 illustrates creation of demandnodes from the bin-level traffic map of the demandmodule. The nodes are limited by traffic and clutter resolution. The traffic map is converted to demandnodes in the optimization module.

Figure 25:
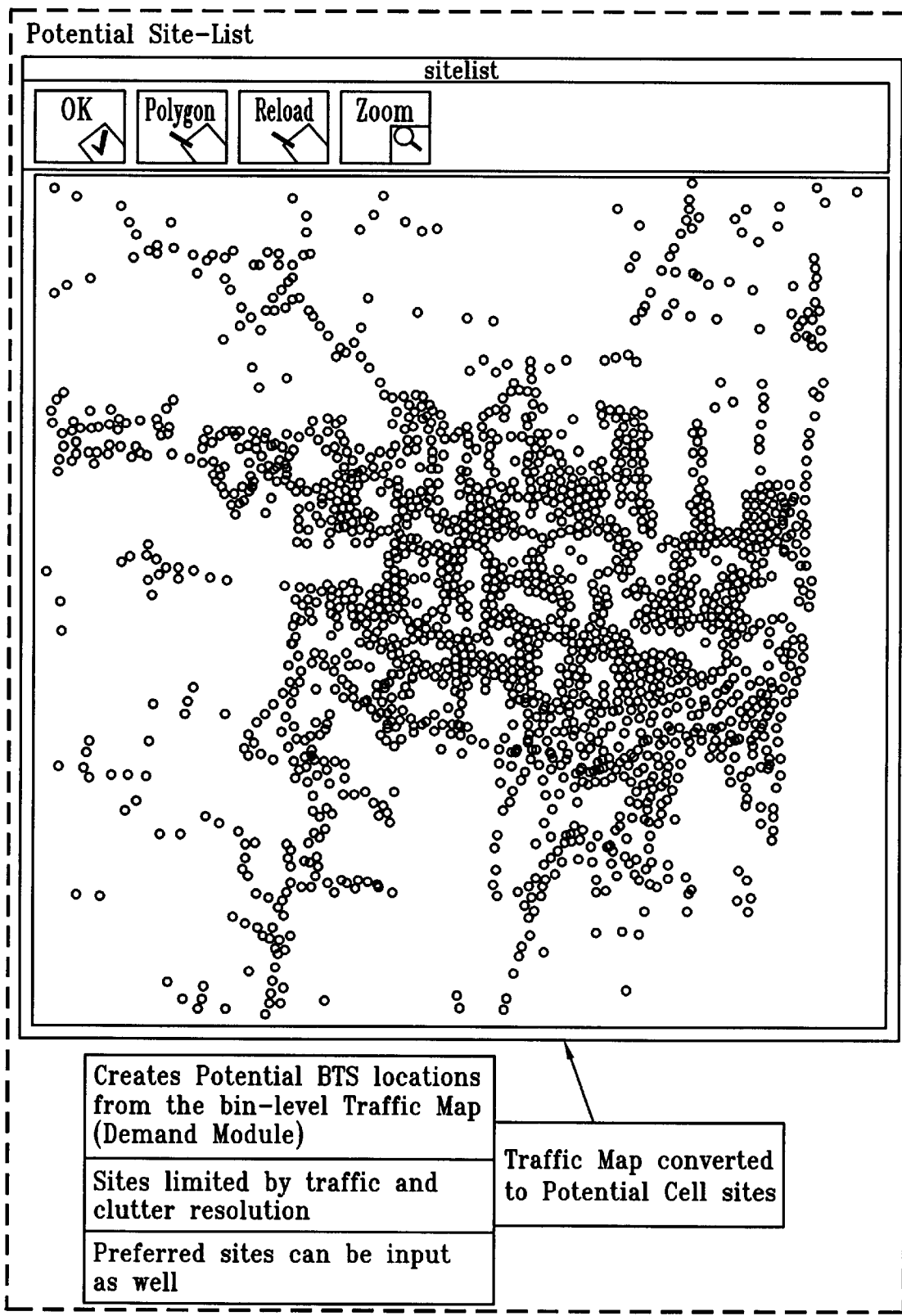

FIG. 25 illustrates the creation of a list of potential cell sites. Potential locations of BTSs are shown by individual dots. Sites are limited by traffic and clutter resolution. Preferred sites can be input into the database, as well. The potential cell sites are derived from the traffic map of the demandmodule.

Figure 26:
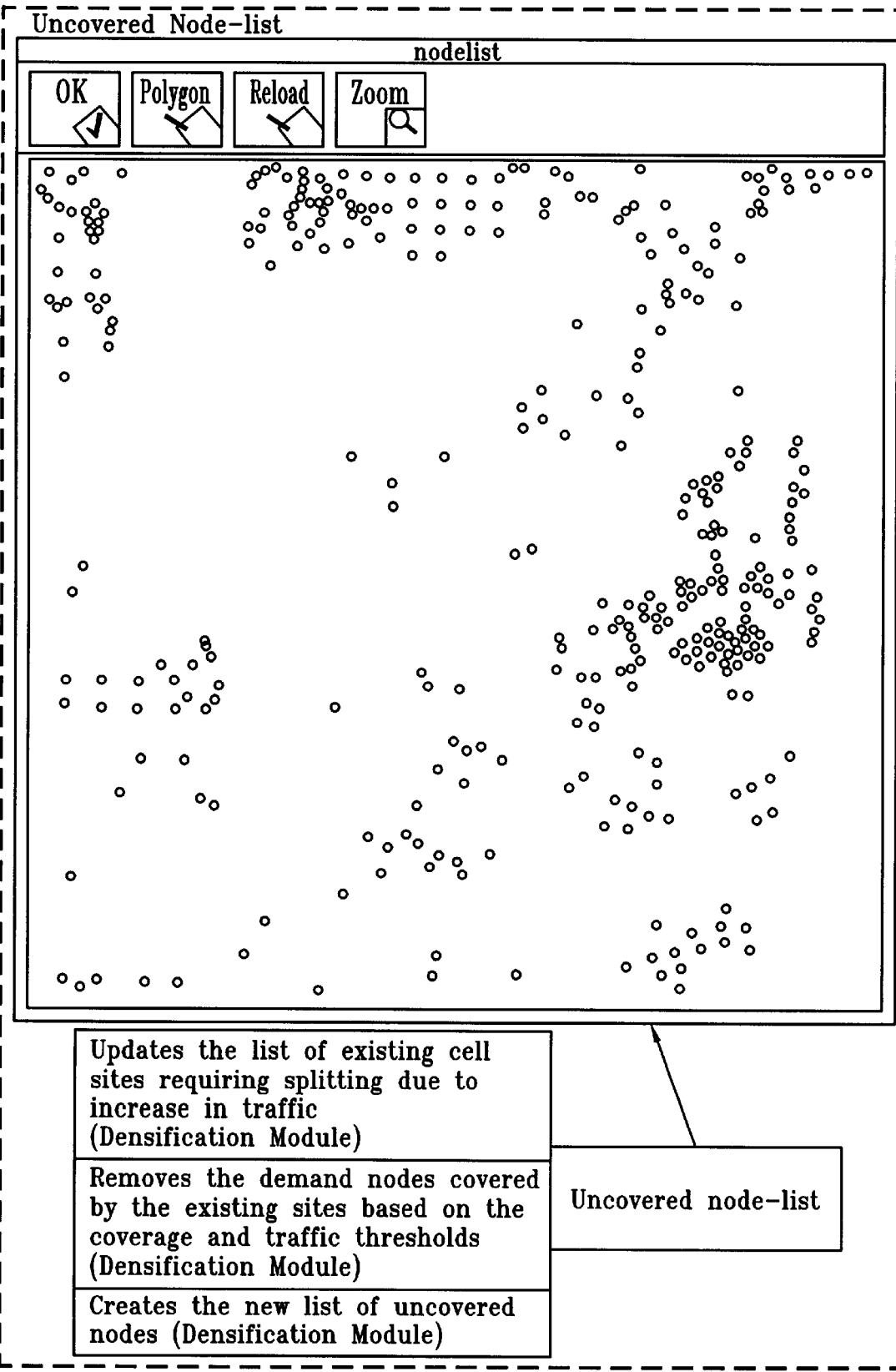

FIG. 26 illustrates the location of uncovered nodes. The system updates the list of existing cell sites requiring cell splitting due to increase in traffic in the densification module. Demandnodes are removed from the graphic representation if covered by the existing sites, as updated, based on selected coverage and traffic thresholds. Remaining is a list and graphic representation of all uncovered nodes.

Figure 27:
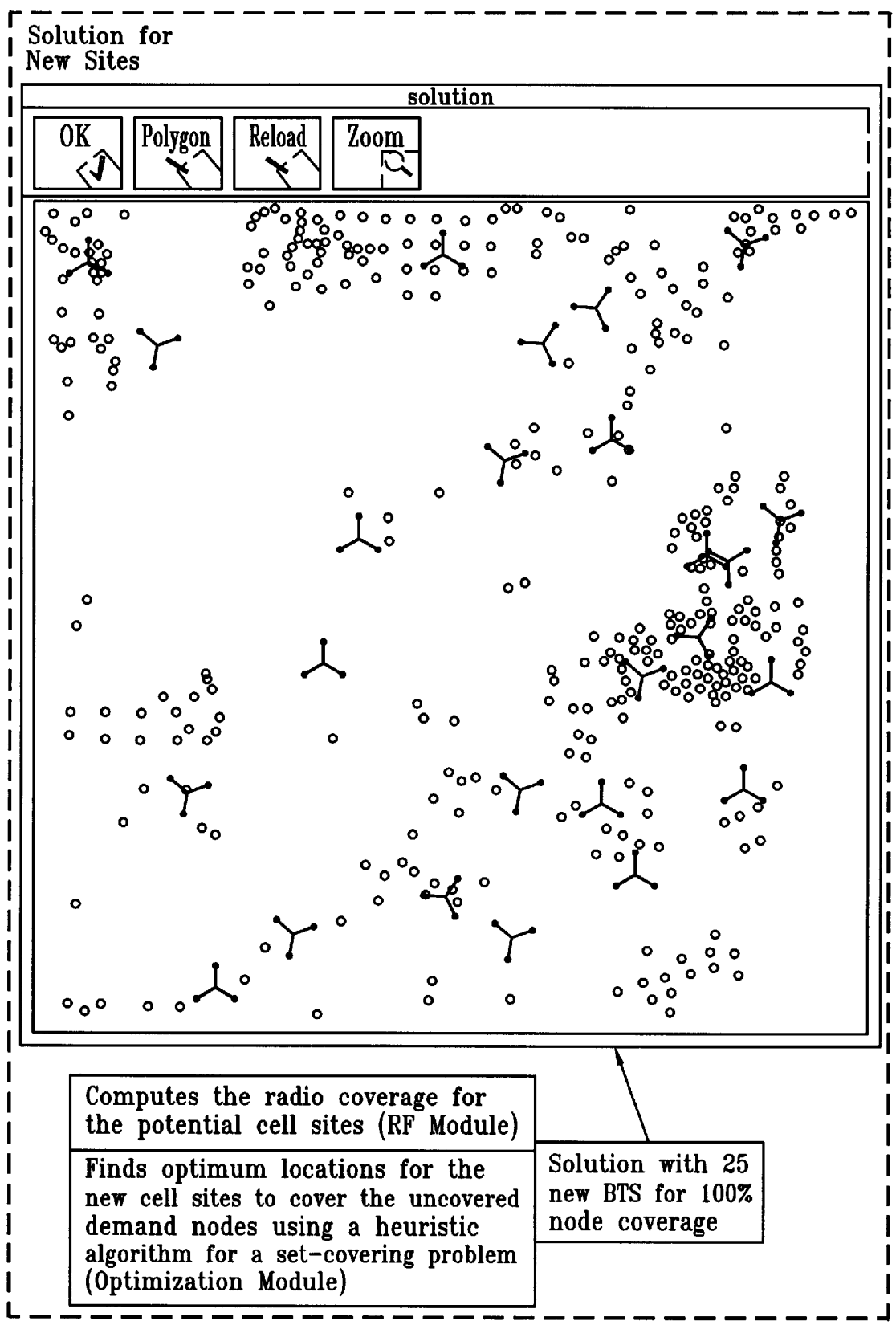

FIG. 27 illustrates selection of the location of potential cell sites, utilizing the RF module and optimization module. The radio coverage of potential cell sites is determined by the RF module. Optimum locations for the new cell sites are determined to cover the uncovered demand nodes in FIG. 26. This is accomplished using a heuristic algorithm for a set-covering problem, implemented in the optimization module.

Figure 28:
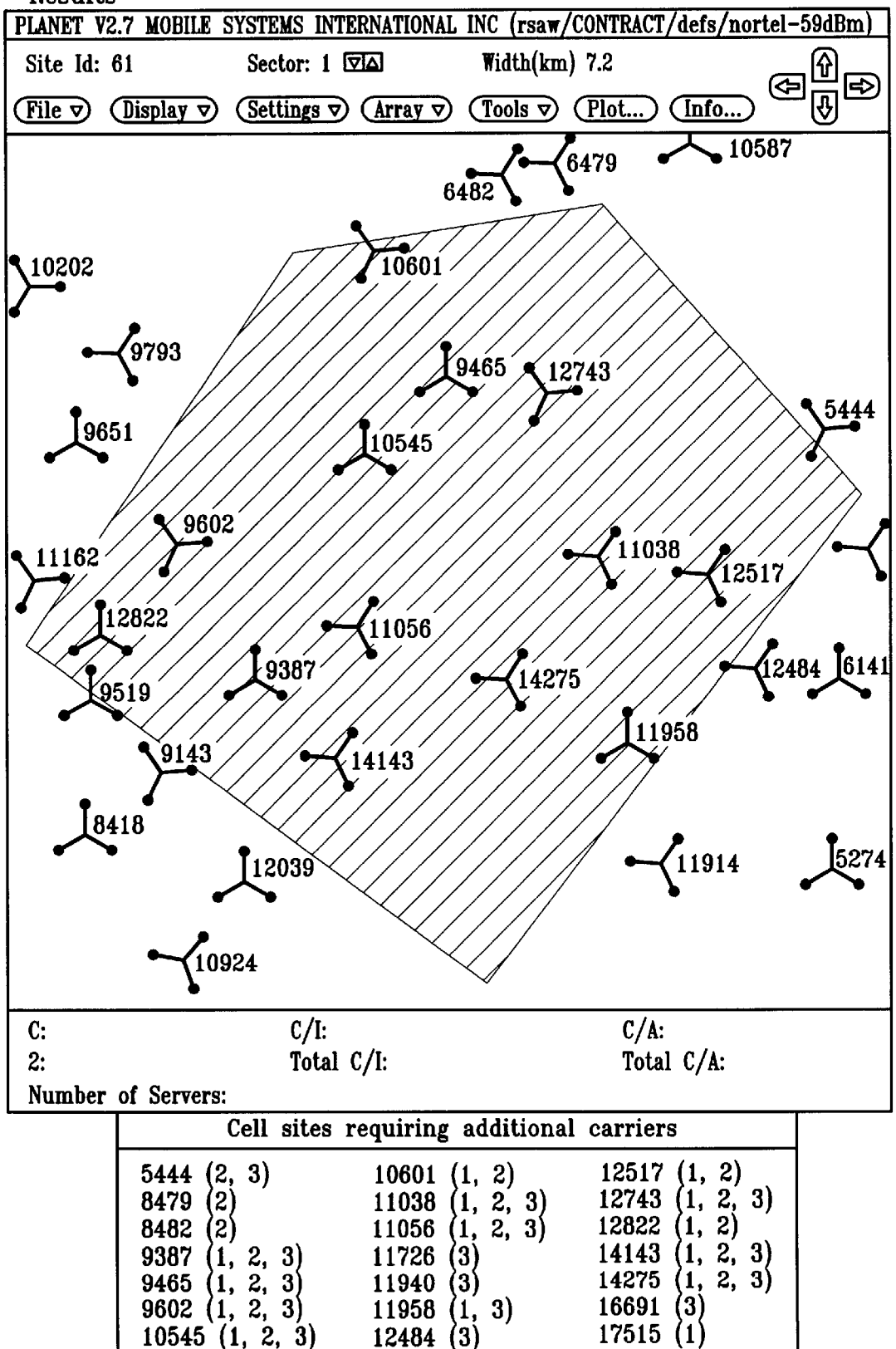

FIG. 28 illustrates a graphic representation of the identification and location of cell sites requiring additional carriers to meet increased traffic demands.

Figure 29:
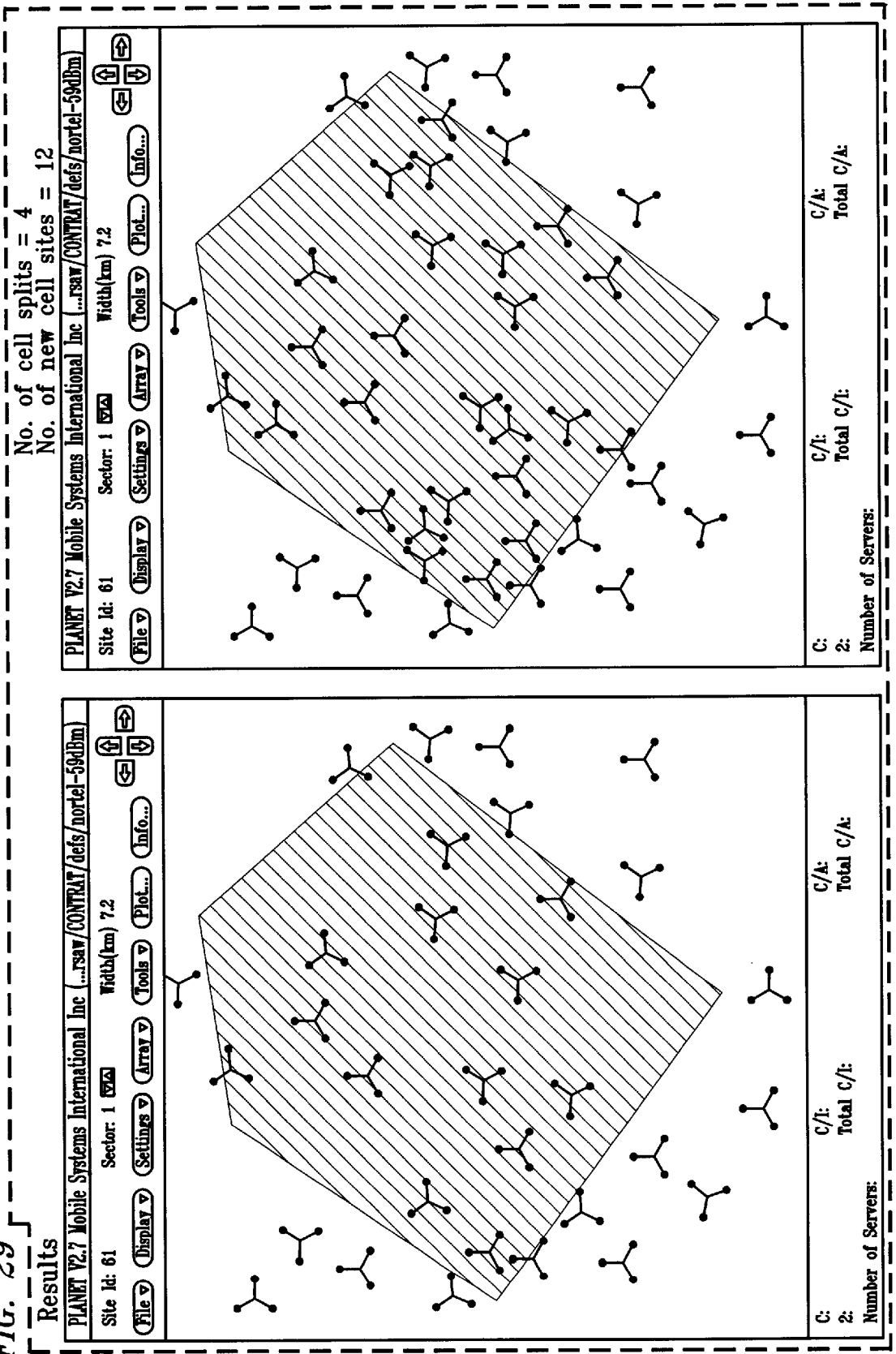

FIG. 29 illustrates the location of additional sites required to meet additional traffic demand, after allocation of additional carriers in FIG. 30 has been made.

FIG. 30 illustrates the coverage resulting from additional cell sites within the selected area.

Figure 31:
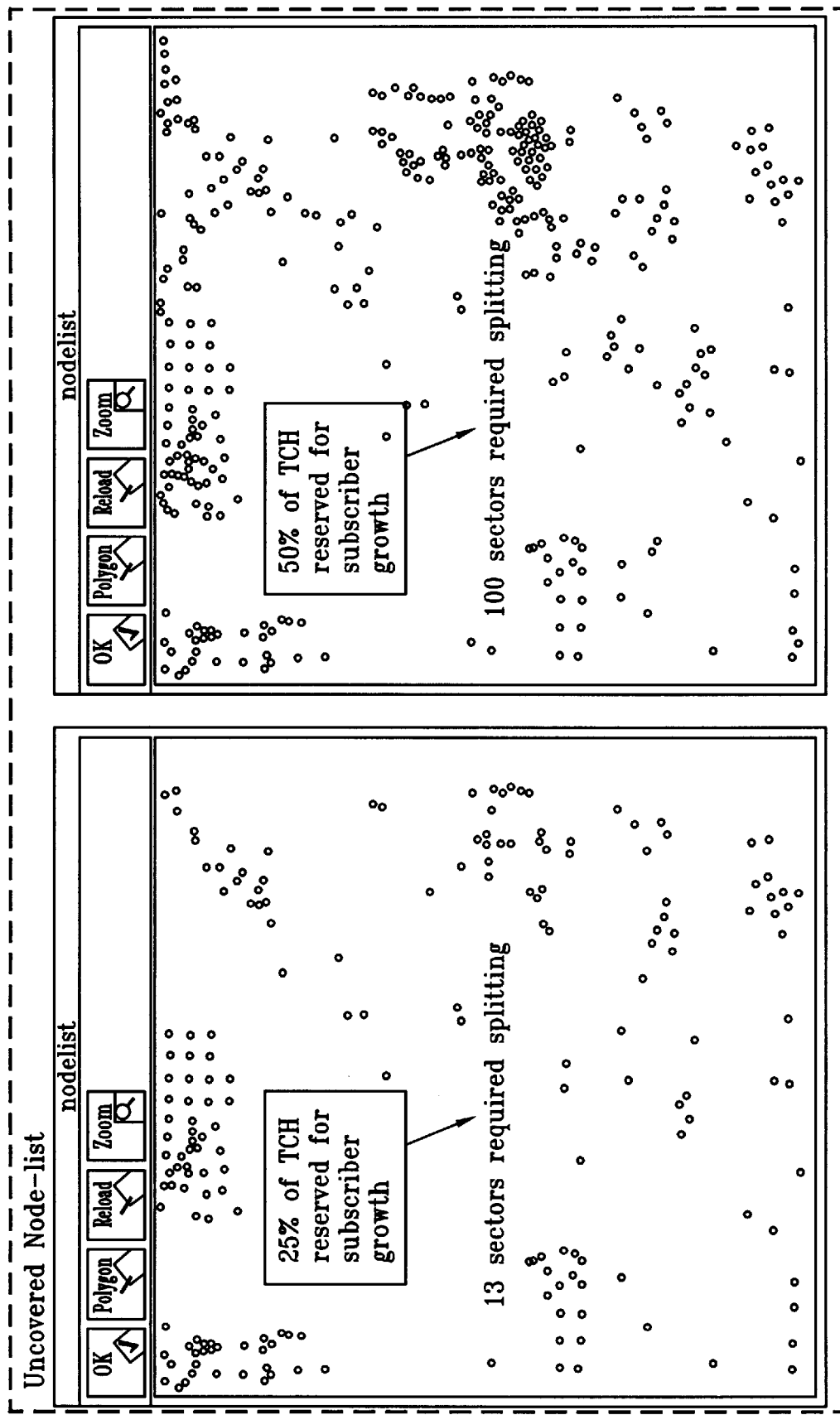

FIG. 31 illustrates use of the system to reserve traffic channel capacity for future subscriber growth of 25% and 50%.

Having thus described the present invention by reference to certain of its preferred embodiments, it is noted that the embodiments disclosed are illustrative rather than limiting in nature and that a wide range of variations, modifications, changes and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method for optimizing an existing wireless network and additions to an existing network, comprising:

determining a value representing an estimation of traffic in one or more discrete bins within a cell, including distributing handover and new cell traffic to each bin based at least in part on the presence of a road in any bin or the proximity of a bin to a handover boundary, wherein the traffic value represents a projection of future handover and traffic estimates; and adjusting coverage and carrier allocations of the cell based at least in part on the determined value representing an estimation of traffic in one or more discrete bins within the cell;

creating an area-level traffic map representing the geographic location of one or more areas and the associated traffic value;

deriving from the area-level traffic map a demand node map representing the geographic location of one or more demand nodes that are associated with a traffic weight value; and removing from the demand node map any demand nodes covered by a portion of the wireless network within acceptable service requirements, wherein the step of removing demand nodes comprises reducing a value representing a transmitter power level of one or more cell sites within the existing map of the portion of the existing wireless network iteratively until traffic represented by one or more demand nodes within an area of coverage of the cell site is below an admissible traffic threshold.

2. The method of claim 1, wherein the step of adjusting coverage and carrier allocation of the cell includes implementation of one or more overlay networks.

3. The method of claim 1, wherein the traffic value is derived, at least in part, from one or more data sets of daytime population distribution, vehicle volume flows, clutter type, handover counts, traffic channel allocations, and timing advance associated with a sector of the cell servicing the area.

4. The method of claim 1, wherein the one or more demand nodes are associated with a clutter value.

5. The method of claim 1, further comprising:

deriving from the area-level traffic map a demand node map; and determining a set of potential cell sites geographically related to the demand node map.

6. The method of claim 5, further comprising determining a radio coverage area of one or more of the potential cell sites.

7. The method of claim 6, wherein the radio coverage area of the potential cell sites is determined with reference to a geographical region.

8. A method for expanding a wireless network or overlaying a wireless network on an existing network, comprising:

providing a map of at least a portion of a wireless network, the map including a demand node map of the future projected traffic;

removing from the demand node map any demand nodes covered by a portion of the wireless network within acceptable service requirements, wherein the step of removing demand nodes comprises reducing a value representing a transmitter power level of one or more cell sites within the existing map of the portion of the existing wireless network iteratively until traffic represented by one or more demand nodes within an area of coverage of the cell site is below an admissible traffic threshold;

overlaying an optimized subset of potential cell sites onto the map of the wireless network to provide service within acceptable service requirements for any remaining uncovered demand nodes on the demand node map; and configuring, operating or providing one or more components or characteristics of a wireless network with reference to the optimized subset of potential cell sites.

9. The method of claim 8, wherein the step of removing demand nodes comprises assigning one or more demand nodes within a coverage area of two or more cell sites to that cell site providing the best service to the demand node, based on applicable link budget requirements.

10. The method of claim 8, wherein the step of overlaying further comprises allocating additional carriers.

11. A method of identifying uncovered nodes in a wireless network, the method comprising the steps of:

receiving a list of one or more demand nodes indicating a projected future traffic level of wireless services within each of one or more demand nodes, each demand node associated with a geographic area;

calculating for at least one sector of at least one base transceiver station a total projected traffic as the sum of demand nodes within the service area of the sector;

adjusting the power level of the base transceiver station such that the projected traffic served by transmissions of the sector does not exceed a maximum traffic threshold; and removing from the list demand nodes that are adequately covered by one or more existing base transceiver stations, creating an uncovered demand nodes list, wherein the step of removing from the list demand nodes comprises reducing a value representing a transmitter power level of one or more cell sites within the existing map of the portion of the existing wireless network iteratively until traffic represented by one or more demand nodes within an area of coverage of the cell site is below an admissible traffic threshold.

12. The method of claim 11, wherein the step of calculating a total projected traffic for the sector further comprises the step of assigning the demand node to the sector providing the best service to the demand node.

13. The method of claim 11, wherein the step of adjusting the power level further comprises adjusting the power level of transmissions within only the sectors in which the projected traffic level exceeds the maximum traffic threshold.

14. The method of claim 11, wherein the method further comprises the steps of:

applying a potential cell site list to the uncovered demand nodes list to determine which demand nodes remain uncovered;

determining potential cell sites that provide coverage to one or more uncovered demand nodes;

removing from the uncovered demand nodes list those demand nodes adequately served by one or more potential cell sites; and providing a list of demand nodes that remain uncovered after applying the potential cell site list.

15. The method of claim 11, wherein the step of calculating further comprises allocating additional carriers.

16. The method of claim 11, wherein the wireless network is a green field network.

* * * * *